(12) United States Patent
Lee et al.

(10) Patent No.: US 10,468,746 B2
(45) Date of Patent: Nov. 5, 2019

(54) ELECTRONIC DEVICE HAVING LOOP ANTENNA

(71) Applicant: SAMSUNG ELECTRONICS CO., LTD., Suwon-si, Gyeonggi-do (KR)

(72) Inventors: Woosup Lee, Suwon-si (KR); Jungsik Park, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 211 days.

(21) Appl. No.: 15/718,327

(22) Filed: Sep. 28, 2017

(65) Prior Publication Data

US 2018/0097275 A1 Apr. 5, 2018

(30) Foreign Application Priority Data

Oct. 5, 2006 (KR) .................. 10-2016-0128402

(51) Int. Cl.
*H01Q 1/22* (2006.01)
*H01Q 7/00* (2006.01)
(Continued)

(52) U.S. Cl.
CPC ......... *H01Q 1/2266* (2013.01); *G06F 1/1635* (2013.01); *G06F 1/1637* (2013.01);
(Continued)

(58) Field of Classification Search
CPC ... G06F 1/1635; G06F 1/1637; H04B 5/0087; H01Q 7/00; H01Q 1/2266; G06K 19/07779
See application file for complete search history.

(56) References Cited

U.S. PATENT DOCUMENTS 9,727,765 B2* 8/2017 Ikemoto ............. G06K 7/10346
10,031,559 B1* 7/2018 Hamel .................. G06F 1/1679
(Continued)

FOREIGN PATENT DOCUMENTS

EP 2 573 871 3/2013
EP 2 894 716 7/2015
(Continued)

OTHER PUBLICATIONS

Extended Search Report dated Feb. 12, 2018 in counterpart European Patent Application No. 17194796.3.

*Primary Examiner* — Hoang V Nguyen
*Assistant Examiner* — Jae K Kim
(74) *Attorney, Agent, or Firm* — Nixon & Vanderhye, P.C.

(57) ABSTRACT

An electronic device includes a housing including a first surface facing in a first direction, a second surface facing in a second direction to the first direction, and a side member enclosing at least a portion of a space between the first surface and the second surface; a first metal plate positioned between the first surface and the second surface; a conductive coil positioned within the housing, having a shaft substantially perpendicular to the first direction or the second direction, and that winds around the first metal plate; a first communication circuit positioned within the housing and electrically connected to the conductive coil; a second communication circuit positioned within the housing and electrically connected to the first metal plate; a display exposed through at least a portion of the first surface; and a processor positioned within the housing and electrically connected to the first communication circuit, the second communication circuit, and the display. The second surface may include a first portion made of a conductive material and including a first opening and a second portion made of a non-conductive material and that fills the first opening. The (Continued)

conductive coil may be positioned under the first portion when viewed from above the second surface. A portion of the first metal plate may be wound with the conductive coil, and another portion of the first metal plate may be electrically connected to the second communication circuit. The another portion may extend to the first opening when viewed from above the second surface, a first magnetic flux may be generated in the conductive coil by the first communication circuit, and a second magnetic flux advancing in a direction perpendicular to an advancing direction of the first magnetic flux may be generated by the second communication circuit in the another portion of the first metal plate.

20 Claims, 37 Drawing Sheets

(51) Int. Cl.
  *G06F 1/16* (2006.01)
  *G06K 19/077* (2006.01)
  *H04B 5/00* (2006.01)
(52) U.S. Cl.
  CPC ......... *G06K 19/07779* (2013.01); *H01Q 7/00* (2013.01); *H04B 5/0087* (2013.01)

(56) References Cited

U.S. PATENT DOCUMENTS

| | | | | |
|---|---|---|---|---|
| 2002/0053992 | A1* | 5/2002 | Kawakami | H01Q 1/22 343/767 |
| 2008/0080320 | A1* | 4/2008 | Abe | G04C 3/14 368/47 |
| 2009/0207083 | A1* | 8/2009 | Miyazaki | G04G 21/04 343/702 |
| 2010/0321267 | A1* | 12/2010 | Ito | H01Q 7/08 343/788 |
| 2012/0235508 | A1* | 9/2012 | Ichikawa | H04B 5/0087 307/104 |
| 2013/0176401 | A1* | 7/2013 | Monari | H04N 5/2252 348/47 |
| 2013/0181876 | A1* | 7/2013 | Miura | G06K 7/10316 343/788 |
| 2014/0035793 | A1 | 2/2014 | Kato et al. | |
| 2014/0104127 | A1* | 4/2014 | Orihara | H01Q 1/243 343/788 |
| 2014/0361944 | A1* | 12/2014 | Yosui | H01Q 1/2225 343/788 |
| 2015/0207913 | A1* | 7/2015 | Nakano | H01Q 7/00 455/41.1 |
| 2015/0236401 | A1* | 8/2015 | Yamaguchi | G06K 7/10316 343/702 |
| 2015/0249282 | A1* | 9/2015 | Orihara | H01Q 1/243 343/702 |
| 2015/0279554 | A1* | 10/2015 | Ryoson | H01Q 7/06 343/788 |
| 2015/0333389 | A1* | 11/2015 | Orihara | H01Q 1/2225 343/788 |
| 2016/0064822 | A1* | 3/2016 | Orihara | G06K 19/07771 343/702 |
| 2016/0164178 | A1* | 6/2016 | Komachi | H01Q 1/38 343/702 |
| 2016/0198028 | A1* | 7/2016 | Orihara | H01Q 1/2225 455/575.7 |
| 2016/0254589 | A1* | 9/2016 | Ju | H01Q 1/2208 343/702 |
| 2016/0268672 | A1* | 9/2016 | Liu | H01Q 1/2208 |
| 2016/0268685 | A1* | 9/2016 | Orihara | H01Q 7/06 |
| 2016/0336645 | A1* | 11/2016 | Orihara | H01Q 1/243 |
| 2016/0352151 | A1* | 12/2016 | Standke | H02J 50/12 |
| 2017/0011839 | A1* | 1/2017 | Nakao | H04M 1/03 |
| 2017/0079257 | A1* | 3/2017 | Haensgen | H04W 76/14 |
| 2017/0324170 | A1* | 11/2017 | Kerselaers | H01Q 1/273 |
| 2017/0372837 | A1* | 12/2017 | Lee | H02J 50/10 |
| 2018/0089551 | A1* | 3/2018 | Orihara | G06K 19/07 |
| 2018/0151941 | A1* | 5/2018 | Orihara | H01Q 7/06 |
| 2018/0211150 | A1* | 7/2018 | Orihara | G06K 19/077 |
| 2019/0157744 | A1* | 5/2019 | Orihara | H01Q 1/24 |

FOREIGN PATENT DOCUMENTS

| | | |
|---|---|---|
| JP | 2008-042761 | 2/2008 |
| JP | 2014-064267 | 4/2014 |
| JP | 5780298 | 9/2015 |

\* cited by examiner

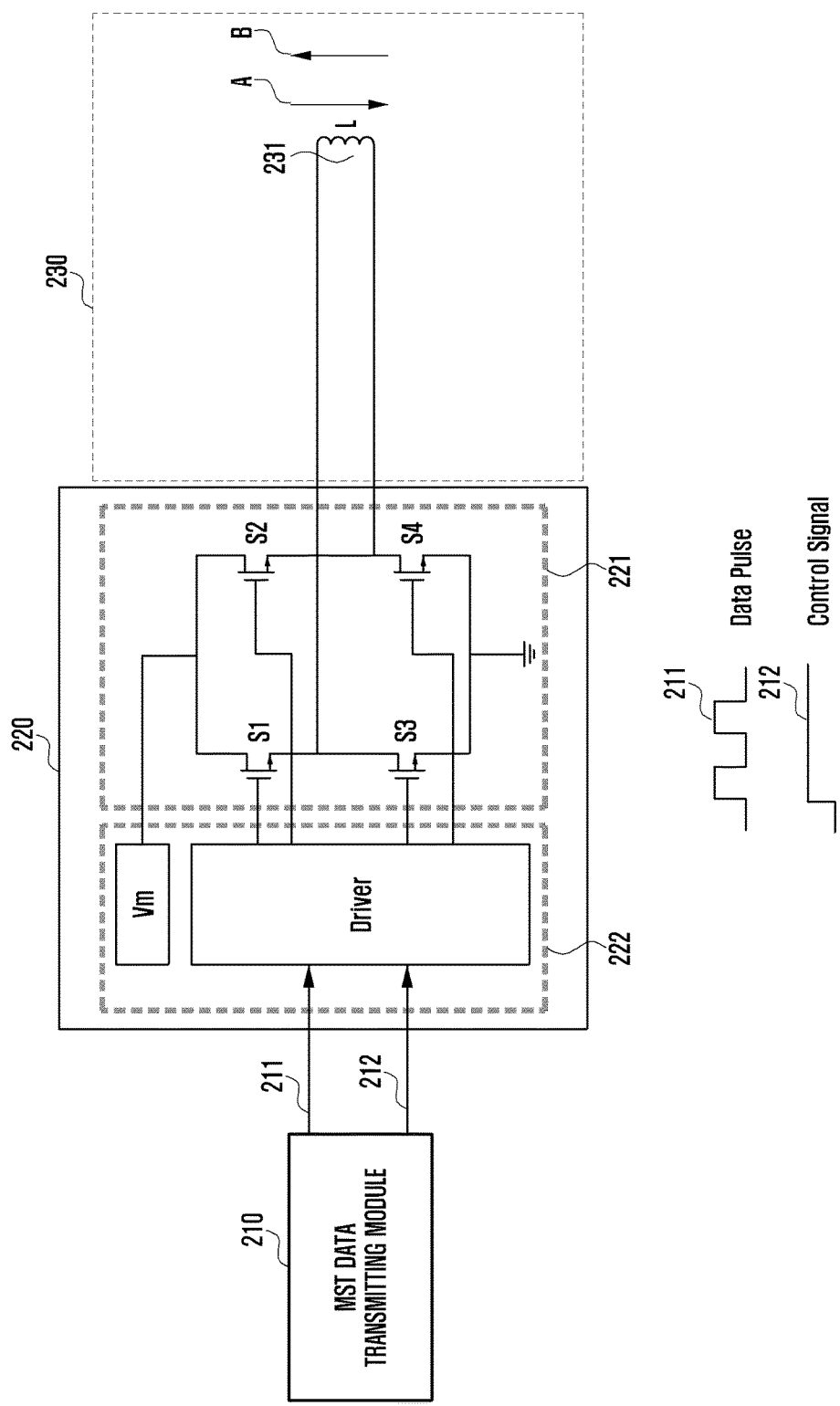

ELECTRONIC DEVICE HAVING LOOP ANTENNA

CROSS-REFERENCE TO RELATED APPLICATION

This application is based on and claims priority under 35 U.S.C. § 119 to Korean Patent Application No. 10-2016-0128402 filed on Oct. 5, 2016, the disclosure of which is incorporated by reference herein in its entirety.

BACKGROUND

Field

The present disclosure relates generally to an electronic device having a loop antenna, and for example, to an electronic device that transmits a magnetic field signal including payment information using a loop antenna.

Description of Related Art

In general, a card reading device (e.g., points of sales (POS) terminal) has a coil and a header for reading information about a track of a magnetic card. The track is card data recorded at a magnetic strip line (e.g., black line having magnetism) of a magnetic card and has a start sentinel (SS), an end sentinel (ES), and a longitudinal redundancy check character (LRC).

When the track is swiped at a header position of a rail portion of the card reading device, a magnetic flux that passes through the coil connected to the header is changed. A current corresponding to the change of the magnetic flux may occur in the card reading device, and the card reading device may read and process card data recorded in the track with such a current.

The electronic device may have a module for magnetic field communication. The electronic device may perform magnetic field communication with another device through such a module.

The electronic device may include an antenna for magnetic field communication. However, as the size of electronic devices becomes smaller and the number of functions provided by electronic devices increases, a space for mounting the antenna in the electronic device may be reduced. Further, there is a problem that various kinds of antennas should be received within a limited space of the electronic device. Further, because various elements of the electronic device are made of a conductive material such as a metal, transmitting and receiving performances of the antenna may deteriorate because of such conductive elements.

SUMMARY

The present disclosure addresses the above problem and provides an electronic device that can secure an improved emission performance.

In accordance with an example aspect of the present disclosure, an electronic device includes a housing including a first surface facing in a first direction, a second surface facing in a second direction opposite the first direction, and a side member that encloses at least a portion of a space between the first surface and the second surface; a first metal plate positioned between the first surface and the second surface; a conductive coil positioned within the housing, having a shaft substantially perpendicular to the first direction or the second direction, and that winds around the first metal plate; a first communication circuit positioned within the housing and electrically connected to the conductive coil; a second communication circuit positioned within the housing and electrically connected to the first metal plate; a display exposed through at least a portion of the first surface; and a processor positioned within the housing and electrically connected to the first communication circuit, the second communication circuit, and the display. The second surface may include a first portion comprising a conductive material and including a first opening and a second portion comprising a non-conductive material and that fills the first opening. The conductive coil may be positioned under the first portion when viewed from above the second surface. A portion of the first metal plate may be wound with the conductive coil, and another portion of the first metal plate may be electrically connected to the second communication circuit. The another portion may be extended to the first opening when viewed from above the second surface. A first magnetic flux may be generated in the conductive coil by the first communication circuit. A second magnetic flux advancing in a direction perpendicular to an advancing direction of the first magnetic flux may be generated in the another portion of the first metal plate by the second communication circuit.

BRIEF DESCRIPTION OF THE DRAWINGS

The above and/or other aspects, features, and attendant advantages of the present disclosure will be more apparent and readily appreciated from the following detailed description, taken in conjunction with the accompanying drawings, in which like reference numerals refer to like elements, and wherein:

FIG. 2 is a block diagram illustrating an example configuration of an electronic device that can perform a payment function using magnetic secure transmission (MST) according to various example embodiments of the present disclosure;

DETAILED DESCRIPTION

Figure 1A:
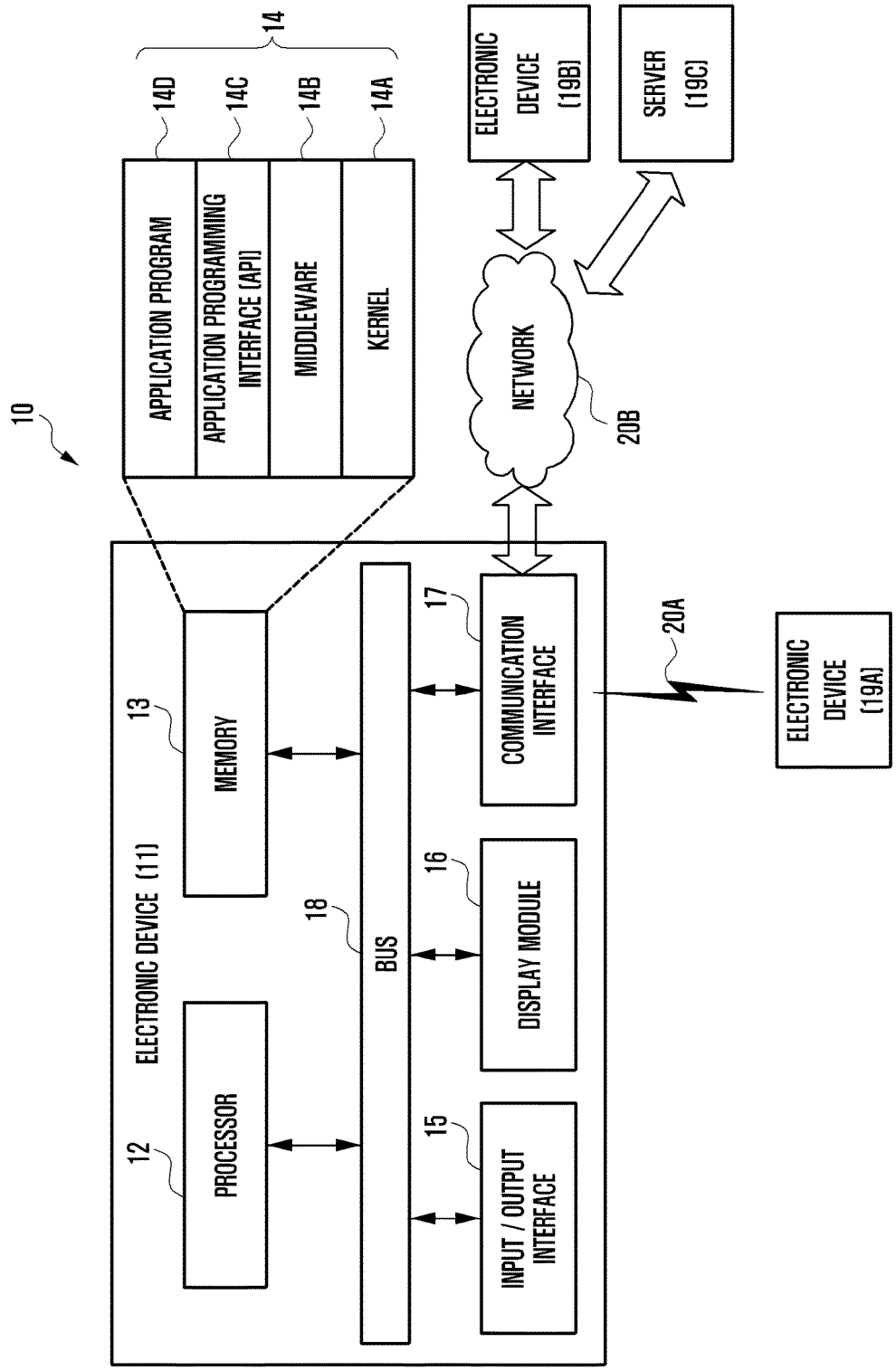
FIG. 1A is a block diagram illustrating an example configuration of a mobile electronic device in a network environment according to various example embodiments of the present disclosure.

The present disclosure is described with reference to the accompanying drawings. Although specific embodiments are illustrated in the drawings and related detailed descriptions are discussed, the present disclosure is not limited thereto, and may have various modifications and several embodiments. It should be understood that the present disclosure includes all changes and/or equivalents and substitutes included in the spirit and scope of embodiments of the present disclosure. In connection with descriptions of the drawings, similar components are designated by the same reference numeral. Detailed descriptions of well known functions and/or configurations will be omitted for the sake of clarity and conciseness.

In embodiments of the present disclosure, expressions such as "include", "have", "may include" or "may have" may be understood to denote a certain characteristic, number, step, operation, element, component or a combination thereof, but may not be construed to exclude the existence of or a possibility of addition of one or more other characteristics, numbers, steps, operations, elements, components or combinations thereof.

In embodiments of the present disclosure, the expressions "or" or "at least one of A or/and B" include any or all of combinations of words listed together. For example, the expressions "A or B" or "at least A or/and B" may include A, B, or both A and B.

The terms "1st", "2nd", "first", or "second" used in embodiments of the present disclosure may modify various components of the embodiments but do not limit the corresponding components. For example, the above expressions do not limit the sequence and/or importance of the components. The expressions may be used for distinguishing one component from other components. For example, a first user device and a second user device indicate different user devices although both are user devices, a first structural element may be referred to as a second structural element, and the second structural element also may be referred to as the first structural element.

When it is stated that a component is "(operatively or communicatively) coupled to" or "connected to" another component, the component may be directly coupled or connected to another component or an additional component may exist between the component and another component. In contrast, when it is stated that a component is "directly coupled to" or "directly connected to" another component, an additional component does not exist between the component and another component.

In the present disclosure, the expression "configured (or set) to do" may be interchangeably used with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer, for example, and without limitation, to a dedicated processor or a generic-purpose processor that may execute one or more software programs stored in a memory device to perform corresponding functions.

In the present disclosure, the term 'screen' may refer to the displaying area of a display unit. For example, in the expressions 'a card (or image thereof) is displayed on the screen,' 'the display unit displays a card on the screen,' and 'the controller controls the display unit to display a card on the screen,' the term 'screen' is used in the sense of a displaying area of the display unit. In addition, the term 'screen' may refer to a displayed object shown on the display unit. For example, in the expressions 'a card screen is displayed,' 'the display unit displays a card screen,' and 'the controller controls the display unit to display a card screen,' the term 'screen' is used in the sense of a displayed object shown on the display unit.

The terms used in describing embodiments of the present disclosure are only examples for describing a specific embodiment but do not limit the embodiments of the present disclosure. Singular forms are intended to include plural forms unless the context clearly indicates otherwise. Unless defined differently, all terms used herein, which include technical or scientific terminologies, have the same meaning as that understood by a person skilled in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to various example embodiments of the present disclosure may include a communication function, and may be one or a combination of a smart phone, a tablet personal computer (PC), a mobile phone, a video phone, an e-book reader, a desktop PC, a laptop PC, a netbook computer, a personal digital assistant (PDA), a camera, a wearable device, such as a head-mounted-device (HMD) including electronic glasses, electronic clothes, an electronic bracelet, an electronic necklace, an electronic appcessary, an electronic tattoo, and a smart watch, or the like, but is not limited thereto.

According to some embodiments, the electronic device may be a smart home appliance having a communication function, such as at least one of a television (TV), a digital video disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame, or the like, but is not limited thereto.

According to some embodiments, the electronic device may include at least one of various types of medical devices including a magnetic resonance angiography (MRA), magnetic resonance imaging (MRI), computed tomography (CT), scanner, and ultrasonic device, a navigation device, a global positioning system (GPS) receiver, an event data recorder (EDR), a flight data recorder (FDR), a vehicle infotainment device, electronic equipment for a ship, such as a navigation device for ship or a gyro compass, avionics, a security device, a head unit for a vehicle, an industrial or home robot, an automated teller machine (ATM), and a point of sales (POS) device, or the like, but is not limited thereto.

According to some embodiments, the electronic device may include at least one piece of furniture or a portion of a building/structure, an electronic board, an electronic signature receiving device, a projector, and various types of measuring devices having a camera function, such as a water, electricity, gas, and radio wave meter, or the like, but is not limited thereto. The electronic device according to embodiments of the present disclosure may be one or a combination of the above described various devices, and may be a flexible device, but are not limited to the above described devices.

A handheld electronic device according to embodiments of the present disclosure may include a combination of the above-listed components or devices and may also be a flexible device, but is not limited to the aforementioned devices.

When a handheld electronic device according to various example embodiments of the present disclosure produces a magnetic field signal, a card reading apparatus is capable of producing the same amount of current as a magnetic card is swiped over the header of the card reading apparatus. For example, the user makes a payment as he/she holds the handheld electronic device up to or near a card reading apparatus.

Magnetic field communication may be implemented with near field communication (NFC), magnetic secure transmission or near field magnetic data stripe transmission (MST), for example. These communication methods are distinguished from each other, in terms of data rate (bit/sec), communication range, and frequency band. While NFC provides bidirectional communication capability, MST has unidirectional communication capability, such as one party transmitting information without a ping signal and another party simultaneously receiving the information.

The term "user" used in embodiments may refer to a person who uses an electronic device or an artificial intelligence electronic device which uses an electronic device.

FIG. 1A is a diagram illustrating an example electronic device 11 in a network environment 10 according to various example embodiments of the present disclosure.

The electronic device 11 may include a bus 18, a processor (e.g., including processing circuitry) 12, a memory 13, an input/output interface (e.g., including input/output circuitry) 15, a display 16, and a communication interface (e.g., including communication circuitry) 17. The electronic device 11 may be configured by removing at least one of the above described components or further including other components.

The bus 18 may include a circuit capable of connecting and transmitting communications between the above described components.

The processor 12 may include various processing circuitry, such as, for example, and without limitation, at least one of a dedicated processor, a central processing unit (CPU), an application processor (AP), and a communication processor (CP), or the like, and is capable of controlling at least one of other components of the electronic device 11 and/or processing data or operations related to communication.

The memory 13 may include, for example, and without limitation, a volatile memory and/or non-volatile memory, and storing data or commands related to at least one of other components of the electronic device 11, such as software and/or a program module 14 including a kernel 14A, middleware 14B, application programming interface (API) 14C, and applications 14D. The kernel 14A, middleware 14B, or at least a portion of the API 14C may be referred to as an operating system (OS).

The kernel 14A is capable of controlling or managing system resources, such as the bus 18, processor 12, and memory 13, used to execute operations or functions of other programs, such as the middleware 14B, API 14C, and applications 14D, and provides an interface capable of enabling the these components to access and control/manage the individual components of the electronic device 11.

The middleware 14B is capable of mediating between the API 14C or applications 14D and the kernel 14A so that the API 14C or the applications 14D can communicate and exchange data with the kernel 14A.

The middleware 14B is capable of processing one or more task requests received from the application programs 14D according to priority, such as by assigning the priority for use of system resources of the electronic device 11 to at least one of the application programs 14D. For example, the middleware 14B processes one or more task requests according to the priority assigned to at least one application program, thereby performing scheduling or load balancing for the task requests.

The API 14C is configured to enable the applications 14D to control functions provided by the kernel 14A or the middleware 14B, and is capable of including at least one interface or function for file control, window control, image processing, or text control.

The input/output interface 15 may include various input/output circuitry and transferring instructions or data, received from the user or external devices, to one or more components of the electronic device 11, and outputting instructions or data, received from one or more components of the electronic device 11, to the user or external devices.

The display module 16 is capable of including a liquid crystal display (LCD), a flexible display, a transparent display, a light emitting diode (LED) display, an organic light emitting diode (OLED) display, micro-electro-mechanical systems (MEMS) display, or an electronic paper display, or the like, but is not limited thereto, and is capable of displaying various types of content, such as texts, images, videos, icons, or symbols, and may also be implemented with a touch screen for receiving touches, gestures, proximity inputs or hovering inputs, via a stylus pen, or a user's body.

The communication interface 17 is capable of establishing communication between the electronic device 11 and an external device, such as a first external electronic device 19A, a second external electronic device 19B, and/or a server 19C, and is capable of communicating with the external device connected to the network 20B via wired or wireless communication. The communication interface 17 may also establish a short-range wireless communication connection 20A with an electronic device, e.g., first external electronic device 19A.

Wireless communication may employ, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), and global system for mobile communication (GSM). Wireless communication may also include short-range communication 20A, such as wireless fidelity (WiFi), Bluetooth® (BT), near field communication (NFC), magnetic secure transmission (MST), and global navigation satellite system (including at least one of global positioning system (GPS), global navigation satellite system (Glonass), Beidou navigation satellite system (hereinafter Beidou), Galileo, and the European global satellite-based navigation system, according to GNSS—using areas and bandwidths.

In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 20B may include at least one of a telecommunications network, such as a local area network (LAN) or wide area network (WAN), the Internet, and a telephone network.

It should be understood that the first and second external electronic devices 19A and 19B may be identical or differ in type to or from the electronic device 11. The server 19C may include one or more groups of servers. A portion or all of the operations executed on the electronic device 11 may also be executed on one or more electronic devices, such as electronic devices 19A and 19B or a server 19C. If the electronic device 11 needs to provide a function or service in an automatic manner or according to a request, the electronic device 11 may not perform the function or service, and instead, may request one of the other devices to execute at least a portion of the functions related to the function or service. In this case, the other devices may execute the requested function or an additional function and may transmit the results to the electronic device 11, which may process the received result or may further process the received result with additional processes to provide the processed requested, function, or service. To this end, the devices may employ cloud, distribution, or client-server computing technologies.

Figure 1B:
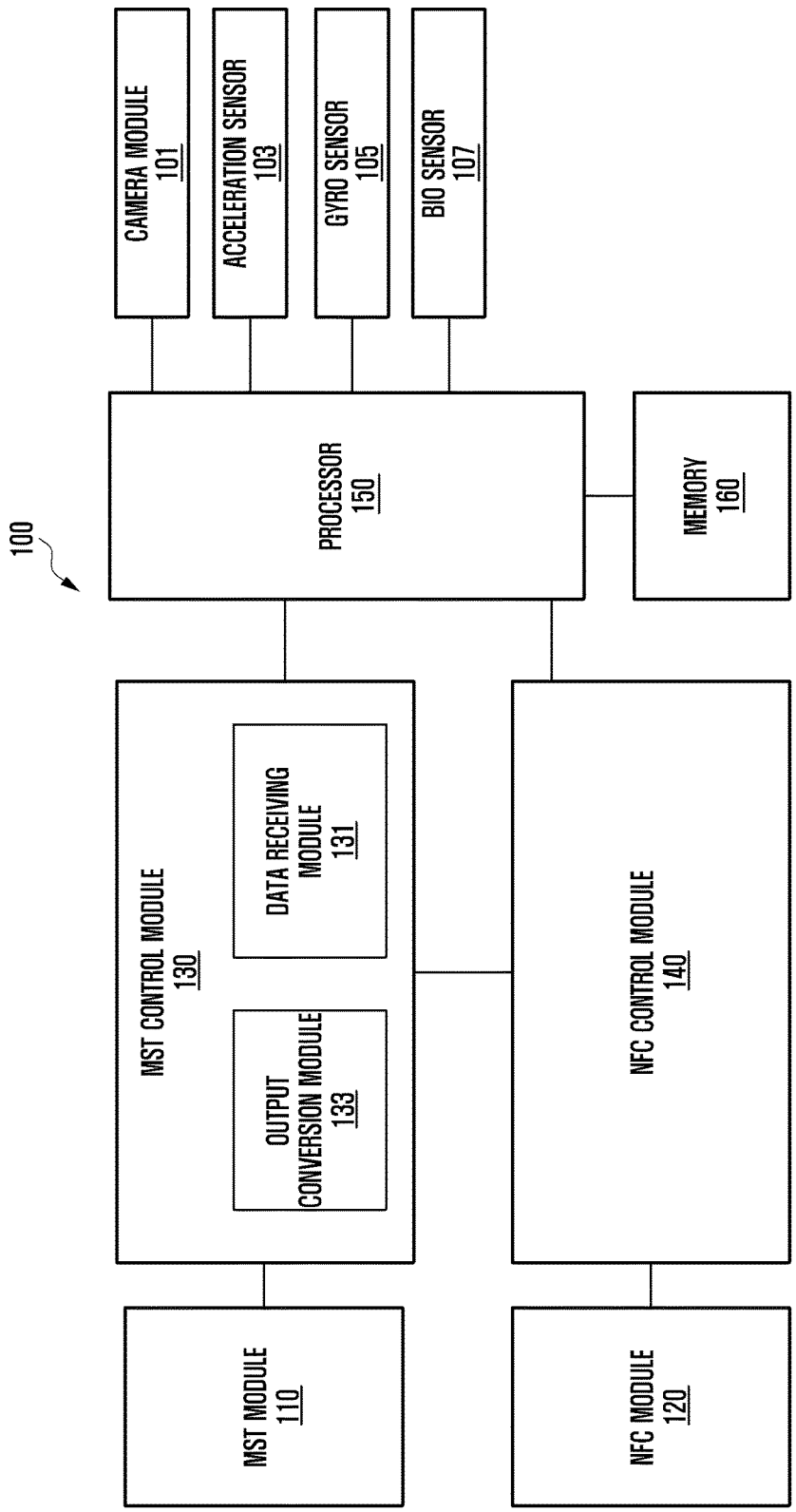
FIG. 1B is a block diagram illustrating an example configuration of an electronic device that can perform a payment function according to various example embodiments of the present disclosure.

FIG. 1B is a block diagram illustrating an example configuration of an electronic device (e.g., the electronic device 11) that can perform a payment function according to various example embodiments.

According to an example embodiment, an electronic device 100 may include, for example, a camera module (e.g., including a camera) 101, acceleration sensor 103, gyro sensor 105, bio sensor 107, MST module (e.g., including communication circuitry) 110, NFC module (e.g., including NFC circuitry) 120, MST control module (e.g., including control circuitry) 130, NFC control module (e.g., including control circuitry) 140, processor (e.g., including processing circuitry) 150, and memory 160.

According to an example embodiment, the camera module 101 may include a camera and photograph a card necessary for payment and acquire card information. The camera module 101 may recognize card information (e.g., card company, card number, card effective date, or card owner) marked in the card through an optical character reader (OCR) function. Alternatively, a user may input necessary card information to the electronic device using an input device (e.g., touch panel, pen sensor, key, ultrasonic input device, or microphone input device) included in a terminal.

According to an example embodiment, the acceleration sensor 103 or the gyro sensor 105 may acquire position information of the electronic device upon payment. The acquired position information of the electronic device may be transferred to the processor 150, and the processor 150 may adjust an intensity of a current fed to an antenna (e.g., coil antenna) of the MST module 110 based on the acquired position information of the electronic device to adjust an intensity of a magnetic field transmitted to a POS terminal or to select a coil antenna to be used in case a plurality of coil antennas exist.

According to an example embodiment, in order to authenticate a user or a card for payment, the bio sensor 107 may acquire the user's bio information (e.g., fingerprint or iris pattern).

According to an example embodiment, the MST module 110 may include a coil antenna. The MST control module 130 may supply different directions of voltages to both ends of the coil antenna according to data (e.g., 0 or 1 bit) and control a direction of a current flowing to the coil antenna. A signal (a magnetic field signal by a coil in which a current flows) transmitted through the coil antenna may generate an induction electromotive force in a POS terminal in a form similar to an operation in which the POS terminal actually reads a magnetic card.

According to an example embodiment, the MST control module 130 may include various control circuitry, including, for example, and without limitation, a data receiving module (e.g., including data receiving circuitry) 131 and an output conversion module (e.g., including output conversion circuitry) 133. The data receiving module 131 may receive a pulse of a logic low/high form including payment information transmitted by the processor 150 (or a security module within the electronic device 100).

According to an example embodiment, in order to transfer data recognized by the data receiving module 131 to the MST module 110, the output conversion module 133 may include a circuit that converts the data in a necessary form. The circuit may include a circuit (h-bridge) that changes a direction of a voltage supplied to both ends of the MST module 110.

According to an example embodiment, the NFC module 120 may include a coil antenna, and the NFC control module 140 may transmit card information to an external device (e.g., card reading device) through the coil antenna.

According to an example embodiment, the electronic device 100 may receive payment information (e.g., track 1, track 2, track 3, or token information) included in at least a portion of a magnetic stripe of a card (e.g., magnetic card) from a card company/bank server through a communication module (not shown) and store the payment information in a form necessary for the memory 160 or a separate internal security module based on card information input through the camera module 101 or the input device (e.g., touch panel, pen sensor).

FIG. 2 is a block diagram illustrating an example configuration of an electronic device that can perform a payment function using MST according to various example embodiments of the present disclosure.

According to an example embodiment, an MST data transmitting module (e.g., including MST data transmitting circuitry) 210 may transmit necessary information upon payment to an MST control module 220. The MST data transmitting module 210 may, for example, and without limitation, include a processor or a trust zone (secure world) within a processor. The MST data transmitting module 210 may include a security module (eSE/UICC) received in the electronic device (e.g., the electronic device 100). The MST data transmitting module 210 may transmit a control signal 212 for enabling an MST output module 230 for a necessary time (e.g., a time consumed in periodically transmitting an MST signal by the predetermined number) together with a data pulse 211. According to another example embodiment, the MST data transmitting module 210 may transmit a differential form of data having different phases. According to another example embodiment, the MST data transmitting module 210 may divide and sequentially transmit track 1, track 2, or track 3 data included in a magnetic card on a time basis or may interleave and transmit each item of data. In another example, the MST data transmitting module 210 may overturn and transmit at least a portion of track 1, track 2, or track 3 data (e.g., change 11110101 to 10101111 by changing the order). In another example, the MST data transmitting module 210 may sequentially transmit a simple sequence (e.g., include one track data for one cycle), a complex sequence (include a plurality of track data for one cycle), and a simple sequence and a complex sequence.

According to an example embodiment, a data receiving module 222 of the MST control module 220 may include various circuitry to recognize a low/high state of a transferred pulse to data (e.g., 0 or 1 bit). Alternatively, the data receiving module 222 may determine the transition number between low/high for a designated time and recognize the transition number as data. For example, for a designated time, when the low/high state transition number is 1, the data receiving module 222 may recognize data as 0 (zero) bit, and when the low/high transition number is 2, the data receiving module 222 may recognize data as 1 (one) bit.

According to an example embodiment, in order to transfer data recognized by the data receiving module 222 to the MST output module 230, an output conversion module 221 of the MST control module 220 may include a circuit that converts the recognized data to a necessary form. The circuit may include a first switch S1, second switch S2, third switch S3, and fourth switch S4. The first switch S1 and the fourth switch S4 may have the same control state, and the second switch S2 and the third switch S3 may have the same control state. A direction of a voltage supplied to both ends of the coil antenna 231 may be changed according to a control state of the switch. In this case, a voltage level supplied to the coil antenna 231 may be Vm. For example, in zero bit, the data receiving module 222 may turn on the first switch and the fourth switch and turn off the second switch and the third switch and vice versa. For example, in one bit, the data receiving module 222 may turn off the first switch and the fourth switch and turn on the second switch and the third switch and vice versa. The output conversion module 221 may change a direction (direction of a current) of a voltage supplied to both ends of the coil antenna 231 to correspond to data recognized in the data receiving module 222, thereby changing a direction of a magnetic field transferred to an external device (e.g., a POS terminal) through the coil antenna. For example, in zero bit, a voltage level applied to the coil antenna 231 may be Vm, and a current direction may be a direction A. In another example, in one bit, a voltage level applied to the coil antenna 231 may be Vm, and a current direction may be a direction B opposite to a direction A. A magnetic field generated in the coil antenna may be similar to a magnetic field generated while a magnetic card is swiped in the POS terminal. The switches S1, S2, S3, and S4 may include, for example, and without limitation, at least one of an N type transistor (e.g., metal oxide semiconductor field effect transistor (MOSFET)), a P type transistor, and a relay.

According to an example embodiment, the MST output module 230 may include a coil antenna 231. The MST output module 230 may further include an inductor, capacitor, and resistor. According to another example embodiment, the MST output module 230 may further include an amplifier for amplifying a signal. The coil antenna 231 may be used for NFC or wireless charge. According to another example embodiment, a plurality of coil antennas may exist.

Figure 3A:
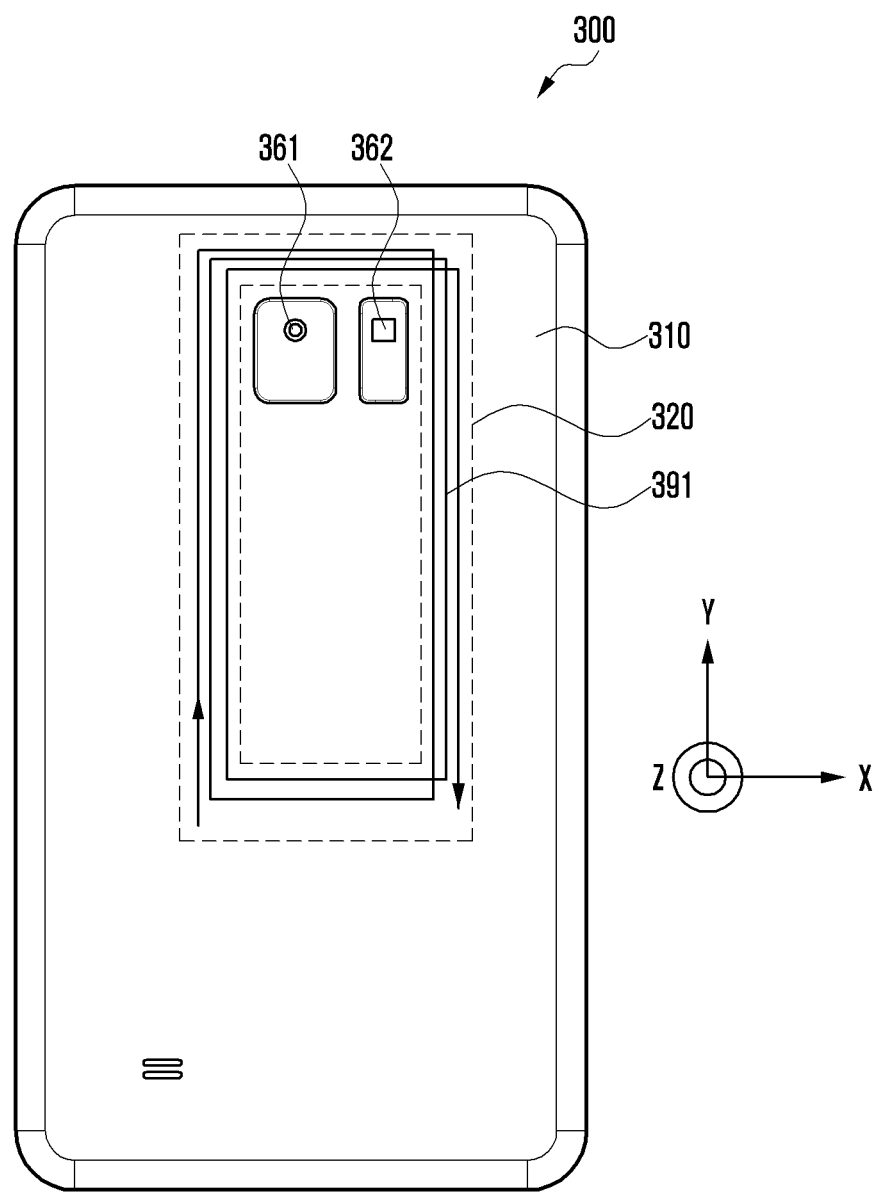
FIGS. 3A and 3B are diagrams illustrating an example electronic device having a flat type loop antenna according to various example embodiments of the present disclosure.
Figure 3B:
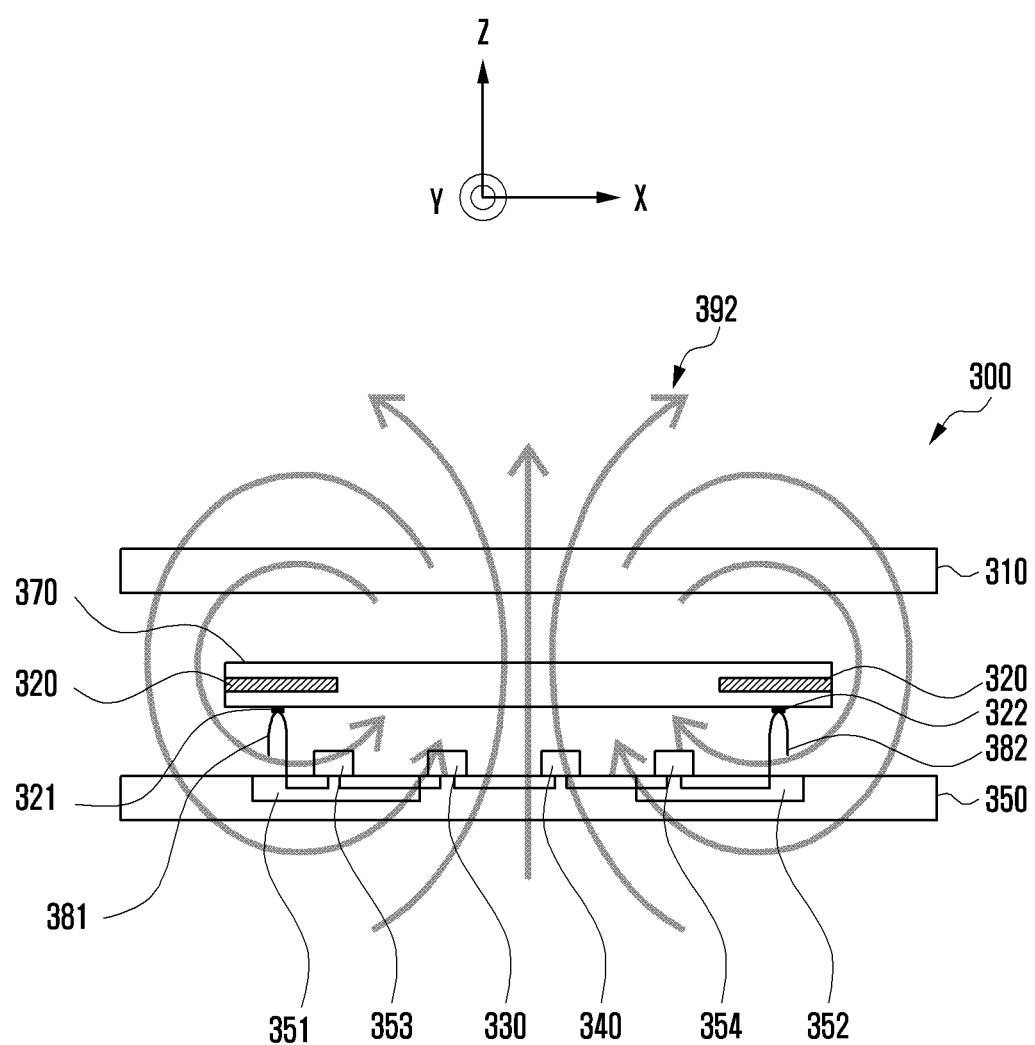

FIGS. 3A and 3B are diagrams illustrating an example electronic device having a flat type loop antenna according to various example embodiments of the present disclosure.

FIG. 3A illustrates a rear surface of an electronic device and a current path in a loop antenna, and FIG. 3B illustrates a cross-section of an electronic device and a magnetic field formed by a loop antenna.

With reference to FIGS. 3A and 3B, an electronic device 300 (e.g., the electronic device 11) may include a cover 310, loop antenna 320, connection module (e.g., including connection circuitry) 330, communication module (e.g., including communication circuitry) 340, and substrate 350.

The cover 310 may configure a rear surface of the electronic device 300 and may be made of a non-conductive material (e.g., plastic, glass). The cover 310 may have an opening for exposing elements of the electronic device 300 to the outside. For example, a camera 361 may be exposed through a first opening, and a flash and a sensor 362 may be exposed through a second opening.

The loop antenna 320 may be implemented with a flat type coil wound in a spiral shape about a Z-axis. Therefore, the loop antenna 320 may generate a magnetic field of a vertical direction (Z-axis direction) at a rear surface (XY plane) of the electronic device 300. The flat coil may be included in a flexible printed circuit board (FPCB) 370. According to an example embodiment, the FPCB 370 may be attached to a lower surface of the cover 310.

The connection module 330 may include various electric circuits. For example, the electric circuit may be formed with a passive element, active element, micro strip line, strip line, interdigital structure body, or a combination of two or more thereof. The electric circuit may change impedance (e.g., input impedance) corresponding to the loop antenna 320 according to a characteristic value (e.g., capacitance, inductance, or resistance). The passive element may include at least one of a capacitor, inductor, or resistor. The active element may include at least one of a diode, field effect transistor (FET), and bipolar junction transistor (BJT). By implementing at least one of the passive element and the active element into a chip or a package or by mounting at least one of the passive element and the active element in the substrate 350, the interdigital structure body may be formed.

The electric circuit may adjust an electrical length of the loop antenna 320 to compensate for a physical dimension of the loop antenna 320.

In communication between the electronic device 300 and another electronic device connected through a network, the communication module 340 may transmit and receive data to and from the other electronic device through the loop antenna 320.

The substrate 350 may provide an electric signal to the loop antenna 320. The substrate 350 may be implemented using at least one of a printed circuit board (PCB) and a flexible printed circuit board (FPCB). The substrate 350 may feed a current to the loop antenna 320 and receive a current from the loop antenna 320. Further, the substrate 350 may operate as a ground plate that may ground the loop antenna 320. The connection module 330 and the communication module 340 may be mounted in the substrate 350 to be electrically connected through a conductive wire. Further, the connection module 330 and the communication module 340 may be electrically connected to the loop antenna 320 through a first connection terminal 381 and a second connection terminal 382, respectively. For example, the first connection terminal 381 and the second connection terminal 382 may electrically contact a first power supply point 321 and a second power supply point 322, respectively, of the loop antenna 320. Further, the first connection terminal 381 and the second connection terminal 382 may be a pin (e.g., C-clip (an electronic contact clip)) having an elastic force.

The substrate 350 may have a dielectric material, for example, a first dielectric material 351 and a second dielectric material 352. The first connection terminal 381 and the second connection terminal 382 may be mounted on the first dielectric material 351 and the second dielectric material 352, respectively. The first connection terminal 381 may be connected to the connection module 330 through a first capacitor 353, and the second connection terminal 382 may be connected to the communication module 340 through a second capacitor 354. The capacitors 353 and 354 may prevent an electric shock and, for example, capacitance may be 10-1000 pF.

When a current is fed from the communication module 340 to the first power supply point 321 or the second power supply point 322 of the loop antenna 320, the current arrives from a corresponding proximity point (e.g., the first power supply point 321) to another power supply point (e.g., the second power supply point 322); thus, a spiral current path 391 is formed about a Z-axis. By such a current path 391, a magnetic field 392 is formed in a Z-axis direction vertical to a current direction (i.e., a rear surface (XY plane) of the electronic device 300. A signal of a specific frequency corresponding to a length (i.e., a length of the current path 391) of the loop antenna 320 is selected (i.e., resonated), and the selected signal is emitted to the outside of the electronic device 300 through the cover 310 made of a non-conductive material. Further, the loop antenna 320 may receive an RF signal of the specific frequency according to a reciprocal principle of an antenna, convert the RF signal to a current, and transfer the current to the communication module 340.

FIGS. 4A, 4B, 4C, 4D, 4E and 4F are diagrams illustrating an example electronic device having a solenoid type loop antenna according to various example embodiments of the present disclosure.

Figure 4A:
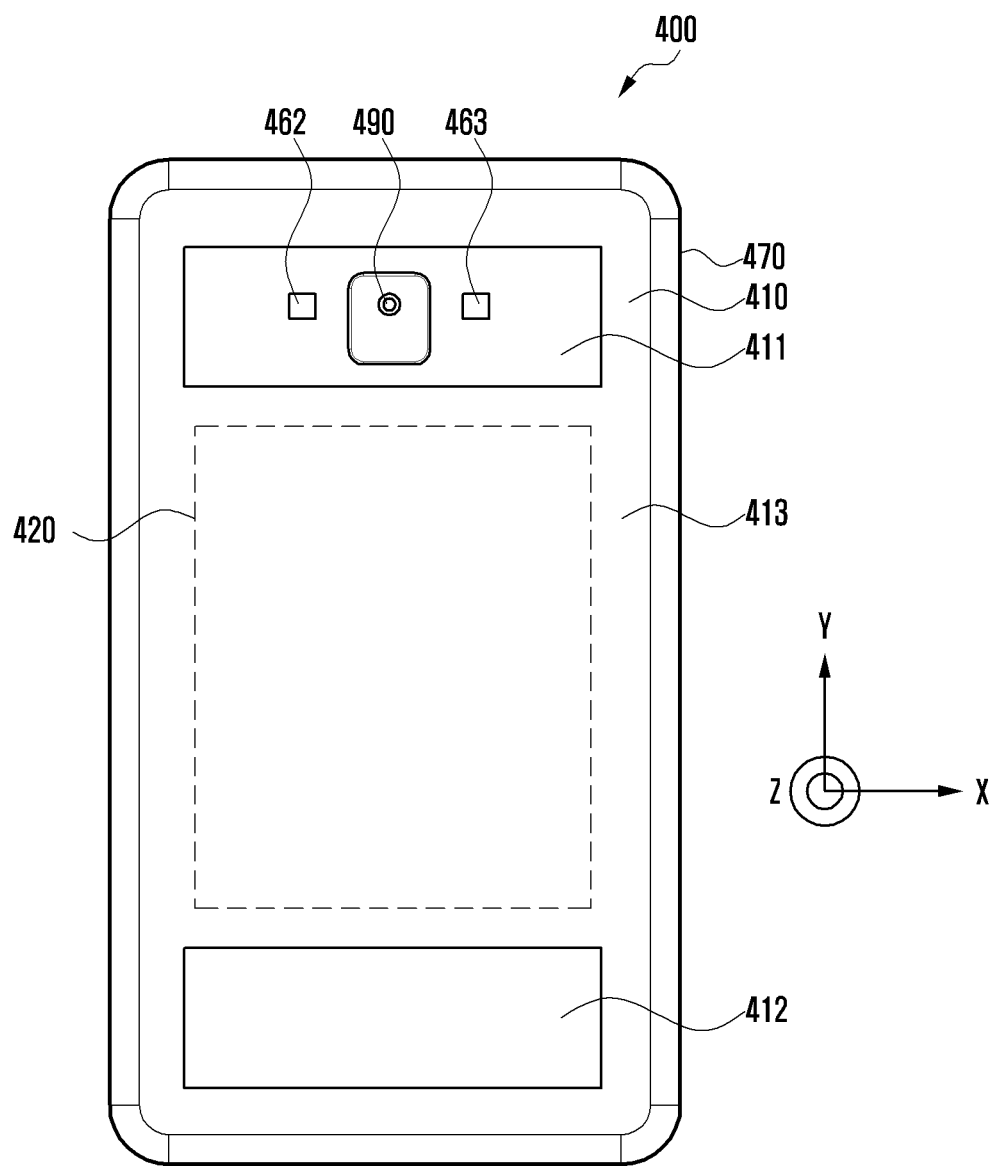
FIGS. 4A, 4B, 4C, 4D, 4E and 4F are diagrams illustrating an example electronic device having a solenoid type loop antenna according to various example embodiments of the present disclosure.
Figure 4B:
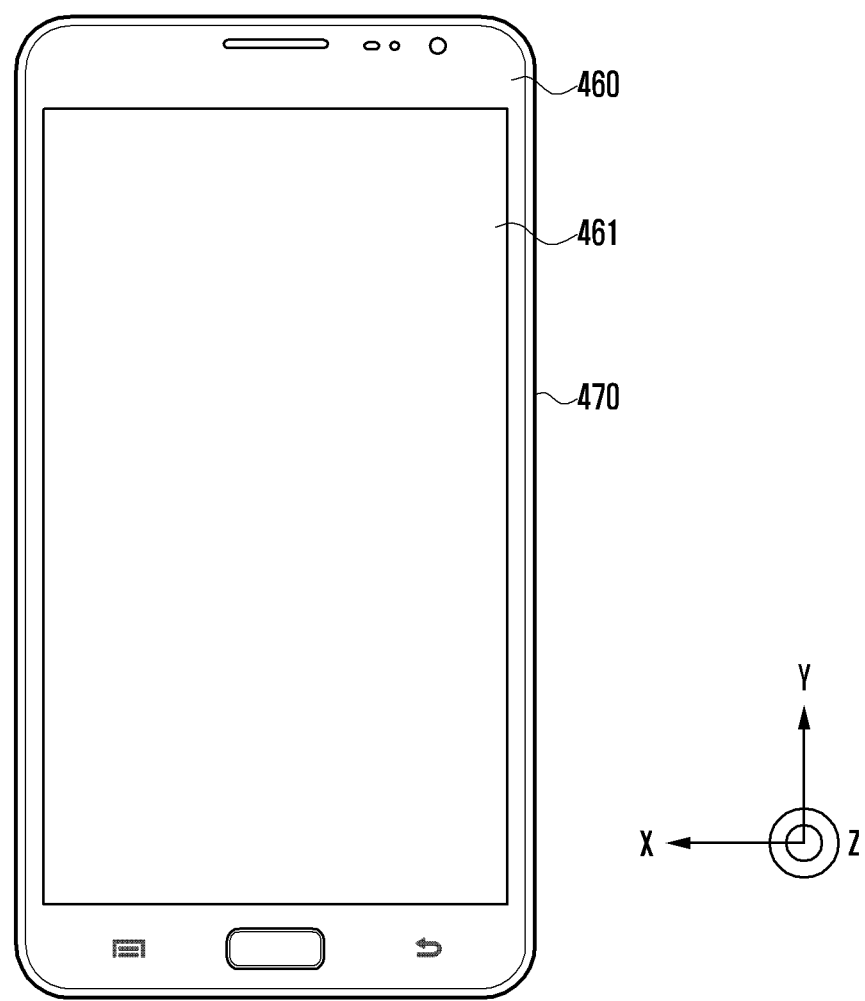
Figure 4C:
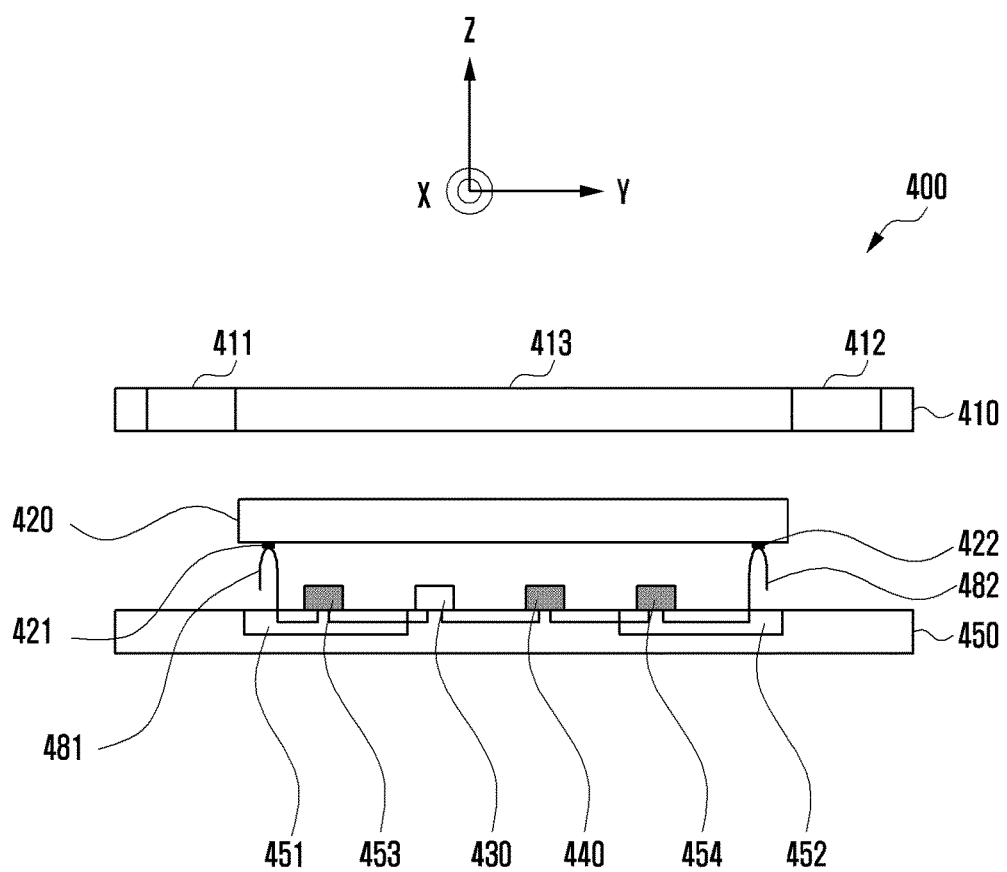
Figure 4D:
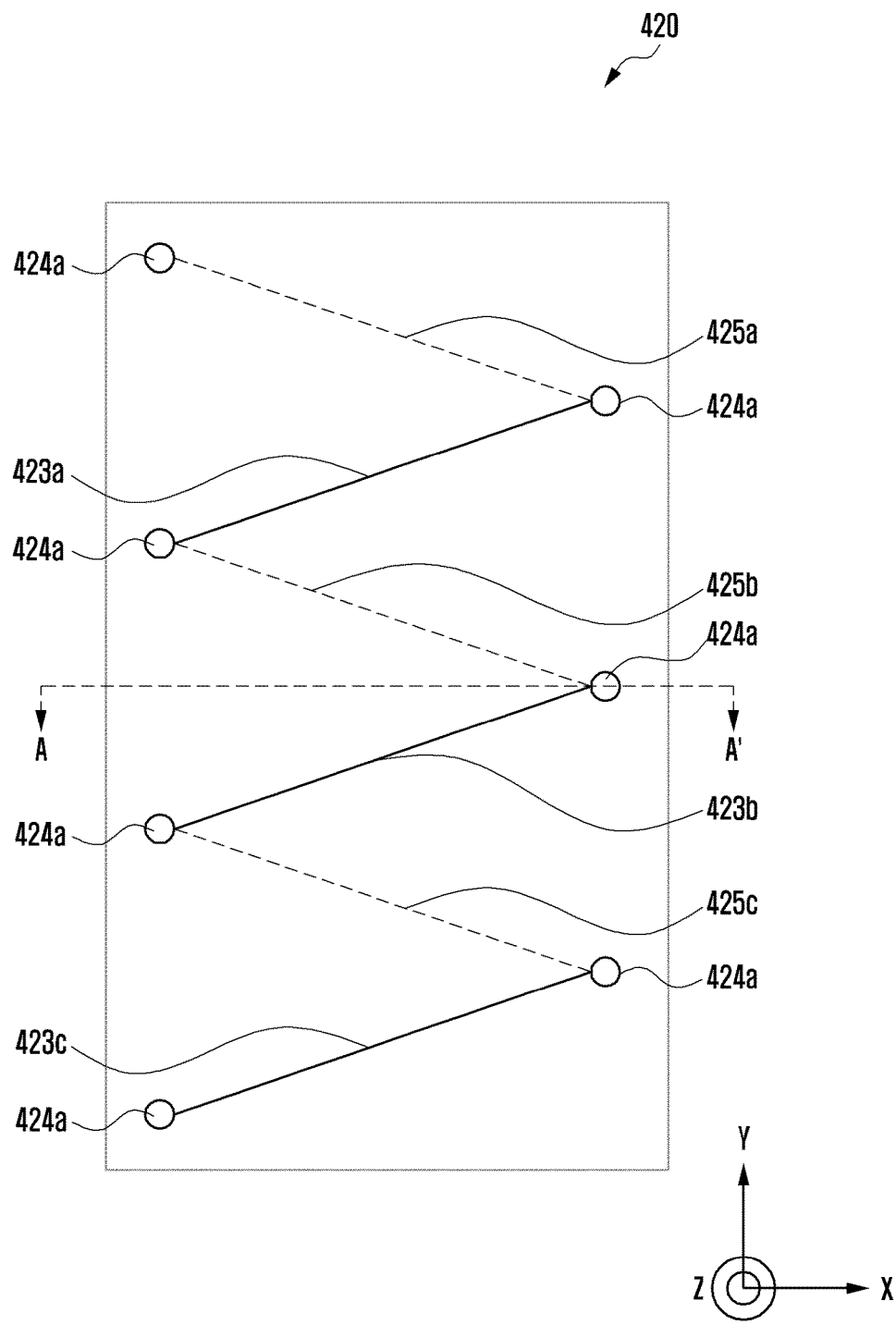
Figure 4E:
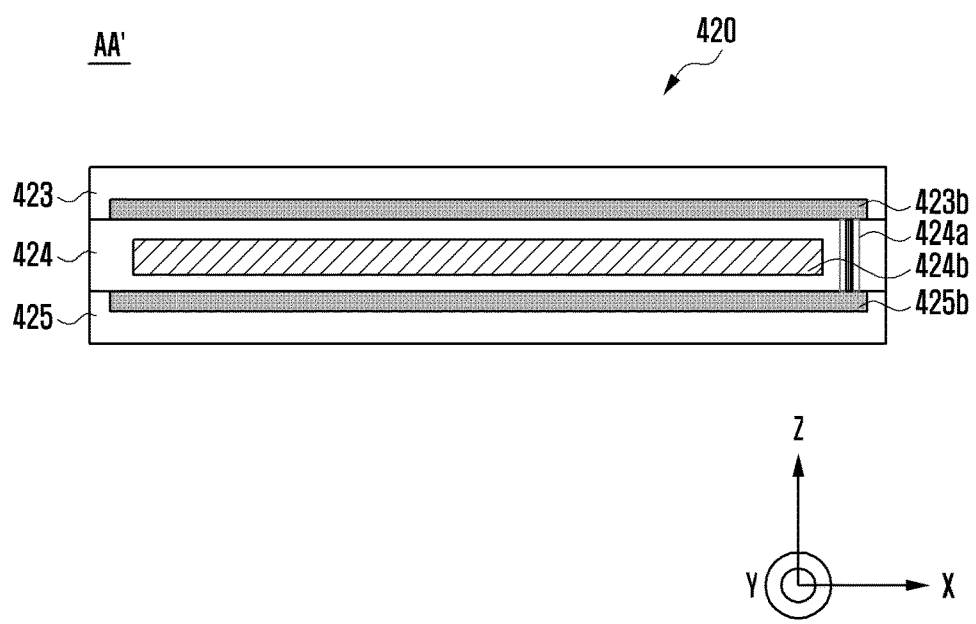
Figure 4F:
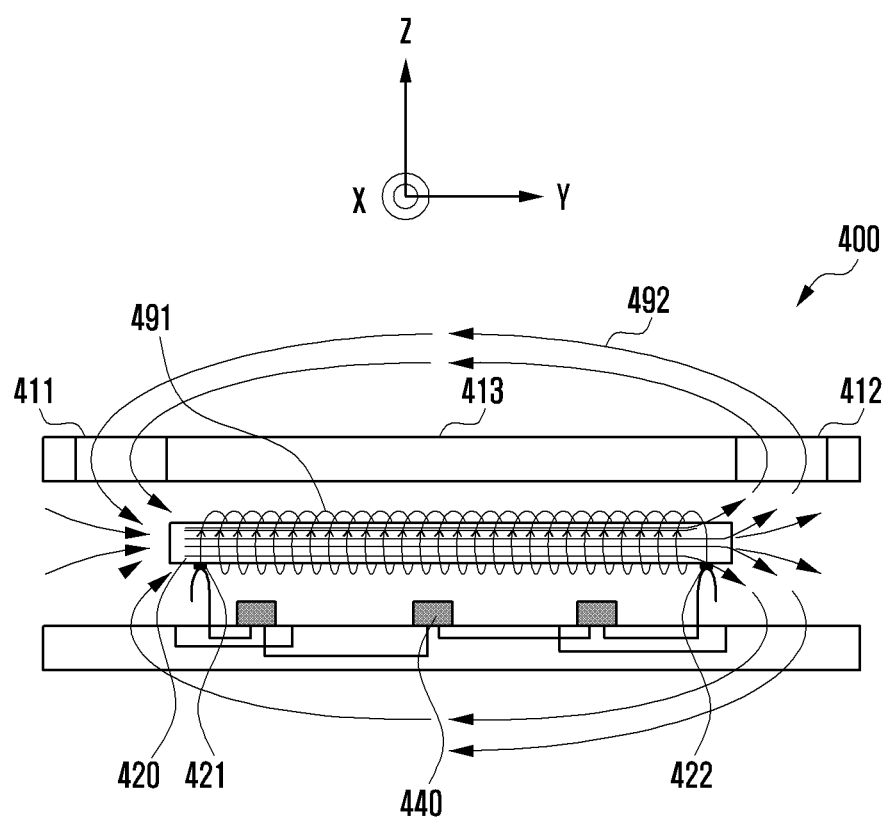

FIG. 4A illustrates a rear surface of an electronic device, FIG. 4B illustrates a front surface of an electronic device, FIG. 4C illustrates a cross-section of an electronic device, FIG. 4D illustrates a front surface of a loop antenna, FIG. 4E illustrates a cross-section of a loop antenna, and FIG. 4F illustrates a cross-section of an electronic device, a current path in a loop antenna, and a magnetic field formed by a loop antenna.

With reference to FIGS. 4A, 4B, and 4C, an electronic device 400 (e.g., the electronic device 11) according to an example embodiment may include a loop antenna 420, connection module (e.g., including connection circuitry) 430 (e.g., the connection module 330), communication module (e.g., including communication circuitry) 440 (e.g., the communication module 340), and substrate 450. Such configurations 420-450 may be positioned within a housing of the electronic device 400. The housing may include a first surface 460 facing in a first direction, a second surface 410 facing in a second direction opposite the first direction, and a side member 470 that encloses a space between the first surface 460 and the second surface 410. For example, the first surface 460 may be a cover including a front surface of the electronic device 400, and the second surface 410 may be a cover including a rear surface of the electronic device 400. A display 461 may be exposed to the outside through the first surface 460. A portion of the first surface 460, the second surface 410, and the side member 470 may be integrally formed.

The cover (that is, the second surface) 410 may be divided into a conductive area made of a conductive material and a non-conductive area made of a non-conductive material. For example, the cover 410 may be divided into a first non-conductive area 411, second non-conductive area 412, and conductive area 413. The first non-conductive area 411 may be disposed to be symmetrical (e.g., to be vertically symmetrical, as illustrated in FIG. 4A) to the second non-conductive area 412. In the cover 410, the remaining areas other than the conductive area 413 and the non-conductive areas 411 and 412 may be made of a conductive material. According to an example embodiment, the remaining areas may be made of a non-conductive material. The cover 410 may have at least one opening for exposing elements of the electronic device 400 to the outside. For example, in the first non-conductive area 411, three openings may be formed, and a camera 490 may be exposed through a first opening, a flash 462 may be exposed through a second opening, and a sensor 463 may be exposed through a third opening.

The loop antenna 420 may be disposed under the conductive area 413 formed between the first non-conductive area 411 and the second non-conductive area 412. According to an example embodiment, the loop antenna 420 may be attached to be electrically insulated from a lower surface of the conductive area 413. The loop antenna 420 may include a solenoid coil wound several times in a Y-axis direction. Therefore, the loop antenna 420 may generate a magnetic flux in a direction parallel to a Y-axis direction of a rear surface of the electronic device 400. A detailed configuration and structure of a solenoid coil according to various example embodiments of the present disclosure will be described with reference to FIGS. 4D and 4E.

The substrate 450 may provide an electric signal to the loop antenna 420. The substrate 450 may be implemented using at least one of a PCB and an FPCB. The substrate 450 may feed a current to the loop antenna 420 and receive a current from the loop antenna 420. Further, the substrate 450 may operate as a ground plate that may ground the loop antenna 420. The connection module 430 and the communication module 440 may be mounted in the substrate 450 to be electrically connected through a conductive wire. Further, the connection module 430 and the communication module 440 may be electrically connected to the loop antenna 420 through a first connection terminal 481 and a second connection terminal 482, respectively. For example, the first connection terminal 481 and the second connection terminal 482 may electrically contact a first power supply point 421 and a second power supply point 422, respectively, of the loop antenna 420. Further, the first connection terminal 481 and the second connection terminal 482 may be a pin (e.g., C-clip) having an elastic force.

The substrate 450 may have a dielectric material, for example, a first dielectric material 451 and a second dielectric material 452. The first connection terminal 481 and the second connection terminal 482 may be mounted on the first dielectric material 451 and the second dielectric material 452, respectively. The first connection terminal 481 may be connected to the connection module 430 through a first capacitor 453, and the second connection terminal 482 may be connected to the communication module 440 through a second capacitor 454. The capacitors 453 and 454 may prevent an electric shock and, for example, capacitance may be 10-1000 pF.

With reference to FIGS. 4D and 4E, the loop antenna 420 may be configured using an FPCB including multi-layers 423, 424, 425. An upper layer 423 may include a plurality of conductive wires 423a, 423b, and 423c comprising a solenoid coil. A lower layer 425 may include a plurality of conductive wires 425a, 425b, and 425c comprising a solenoid coil. In the intermediate layer 424, conductive vias 424a for configuring a solenoid coil may be formed. That is, conductive wires disposed at the upper layer 423 and conductive wires disposed at the lower layer 425 may be electrically connected through the vias 424a, which are an intermediary to configure a solenoid coil. Further, the intermediate layer 424 may include a core 424b (e.g., magnetic body) for increasing a magnetic force generated through a solenoid coil. According to an example embodiment, the core 424b may be omitted from a configuration of the loop antenna 420. Although not shown, in the substrate 450, a processor (e.g., the processor 12) for controlling communication and power supply of the communication module 440 may be mounted.

With reference to FIG. 4F, when a current is fed from the communication module 440 to the first power supply point 421 or the second power supply point 422 of the loop antenna 420, the current arrives from a corresponding proximity point (e.g., the first power supply point 421) to another power supply point (e.g., the second power supply point 422); thus, a cylindrical current path 491 is formed about a Y-axis. By such a current path 491, a magnetic field 492 is formed in a Y-axis direction (i.e., a direction horizontal to a rear surface of the electronic device 400) vertical to a current direction. A magnetic flux of the magnetic field 492 penetrates the first non-conductive area 411 and the second non-conductive area 412; thus, the magnetic field 492 may not be shielded by the conductive area 413 and may be formed at the outside of the electronic device 400.

Figure 5:
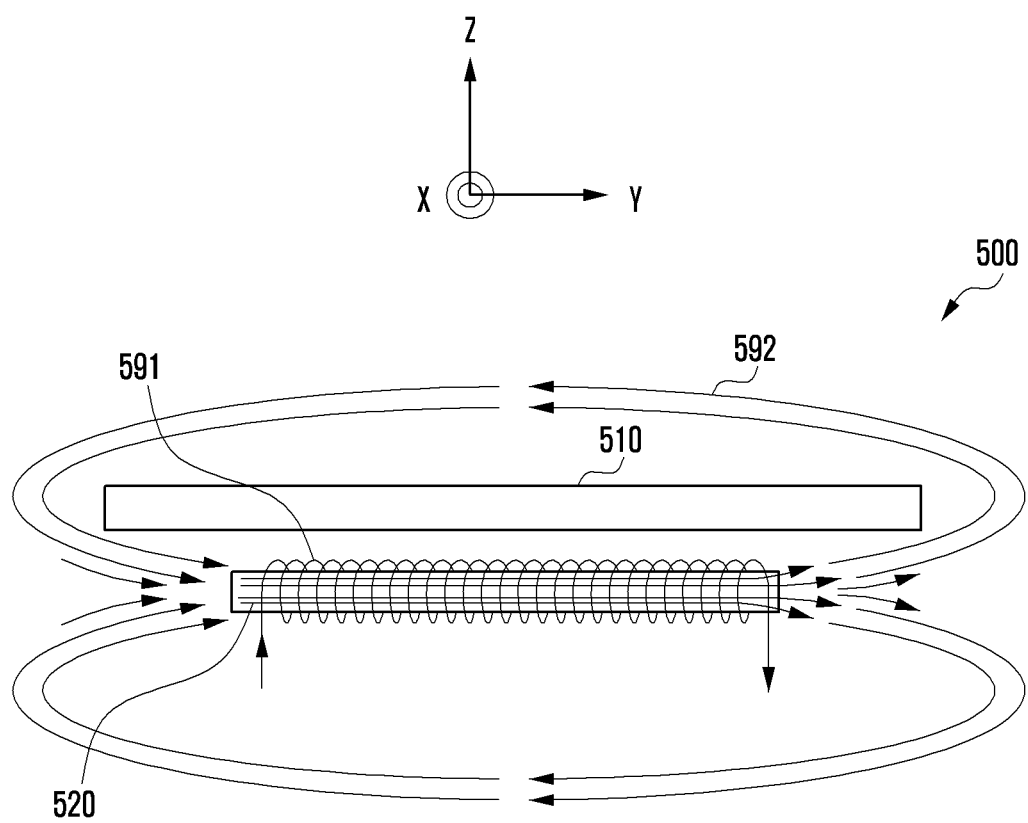
FIG. 5 is a diagram illustrating an example electronic device having a solenoid type loop antenna according to various example embodiments of the present disclosure.

FIG. 5 is a diagram illustrating an example magnetic field formed by a loop antenna and a cross-section of an electronic device having a solenoid type loop antenna according to various example embodiments of the present disclosure.

With reference to FIG. 5, an electronic device 500 (e.g., the electronic device 11) according to an example embodiment may include a cover 510, loop antenna 520, connection module (not shown) (e.g., the connection module 330), communication module (not shown) (e.g., the communication module 340), and substrate (not shown) (e.g., the substrate 450).

The cover 510 may configure a rear surface of the electronic device 500 and may be made of a conductive material. Although not shown, the cover 510 may have an opening for exposing an element (e.g., camera, flash, and sensor) of the electronic device 500 to the outside. The loop antenna 520 may be disposed under the cover 510 (e.g., attached to be electrically insulated from a lower surface of the cover 510) and may be a solenoid coil (e.g., the loop antenna 520) wound several times in a Y-axis direction (i.e., horizontal direction to a rear surface of the electronic device 500). When a current is fed to the loop antenna 520, a cylindrical current path 591 is formed about a Y-axis. By such a current path 591, a magnetic field 592 is formed in a Y-axis direction, which is vertical to a current direction. Therefore, some magnetic fluxes of the magnetic field 592 may detour the cover 510 to be emitted to the outside. Therefore, the magnetic field 592 may not be shielded by the cover 510 made of a conductive material and may be formed at the outside of the electronic device 500.

Figure 6A:
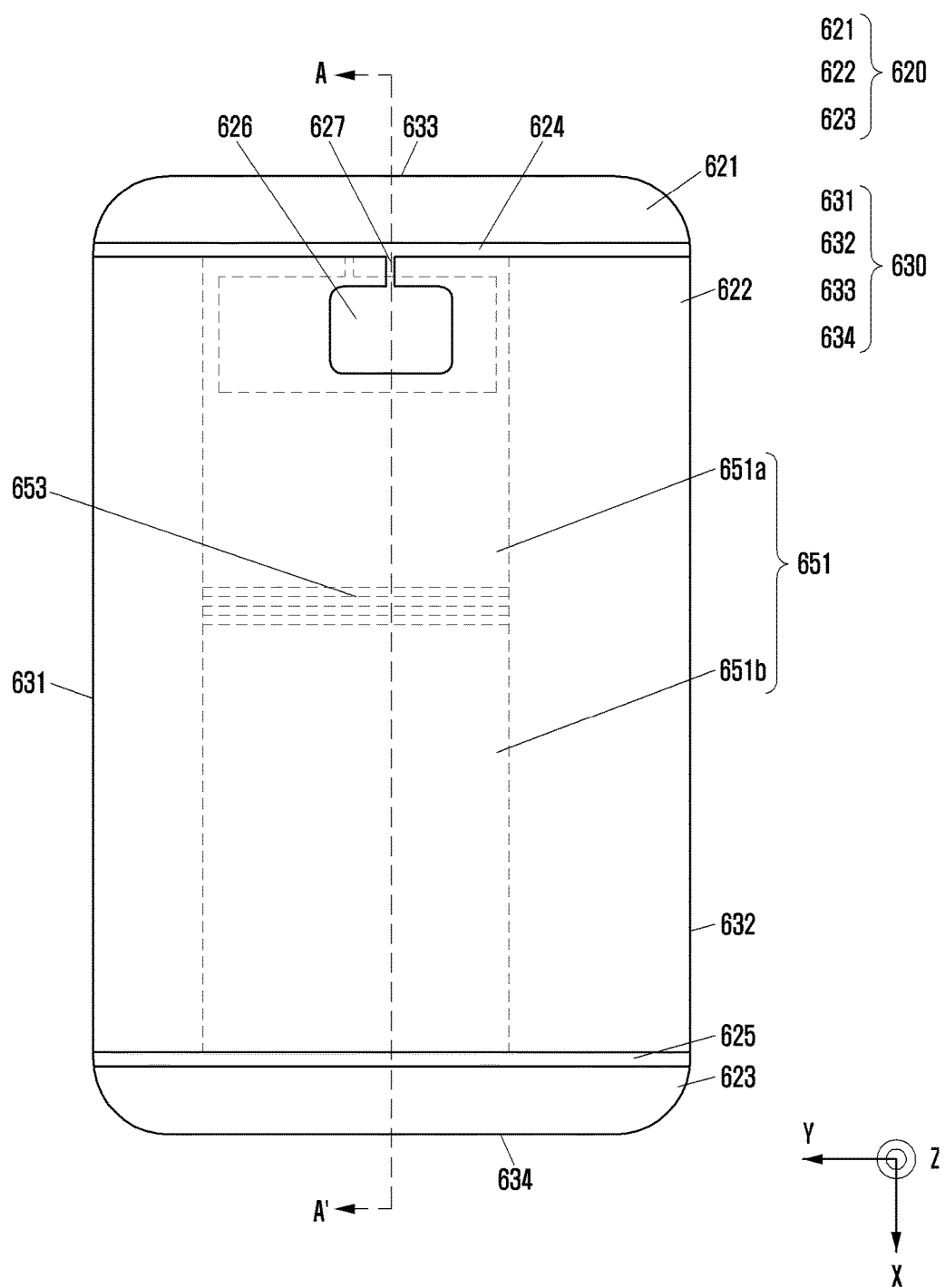
FIGS. 6A, 6B and 6C are diagrams illustrating an example electronic device having a flat type and solenoid type (combination (combo) type) loop antenna according to various example embodiments of the present disclosure.
Figure 6B:
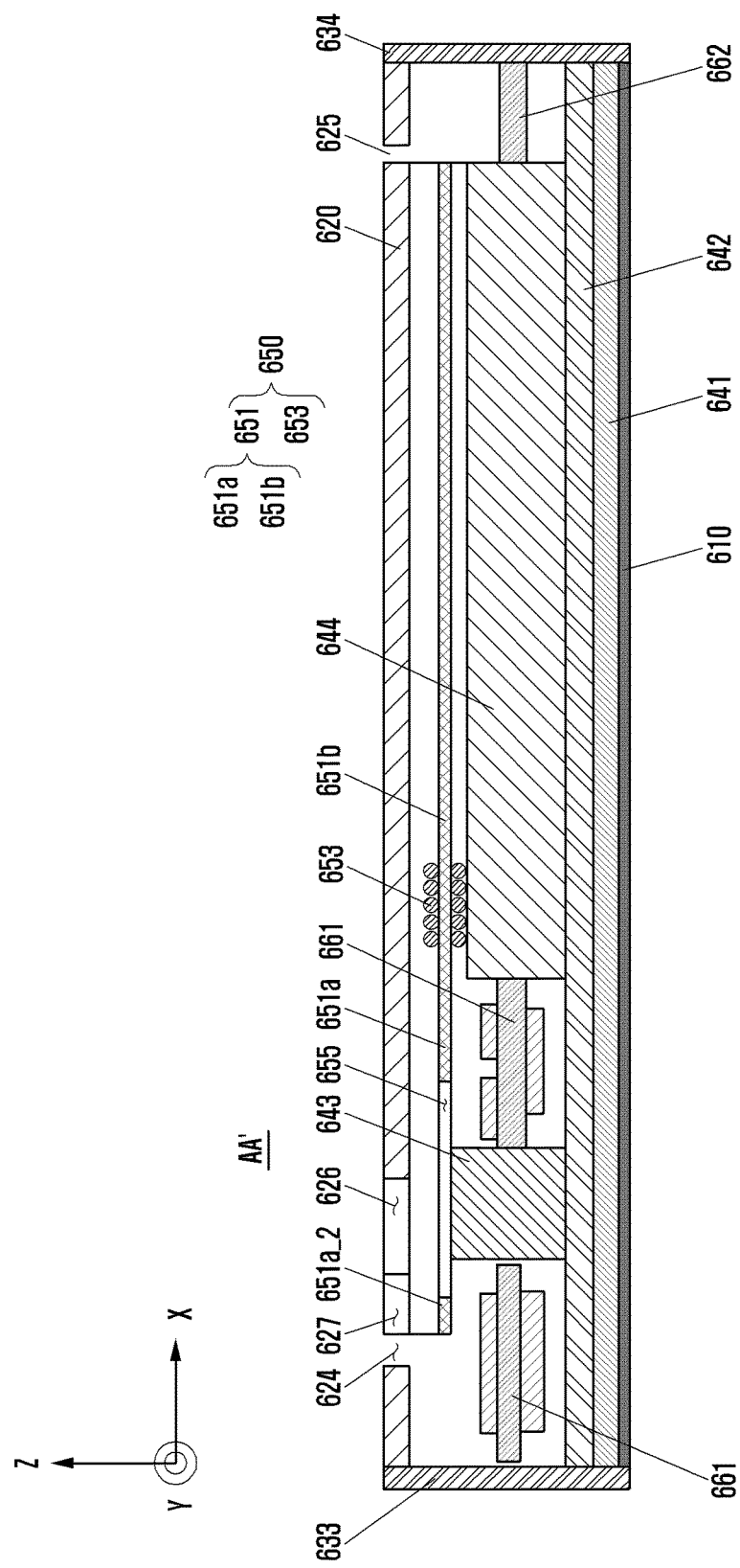
Figure 6C:
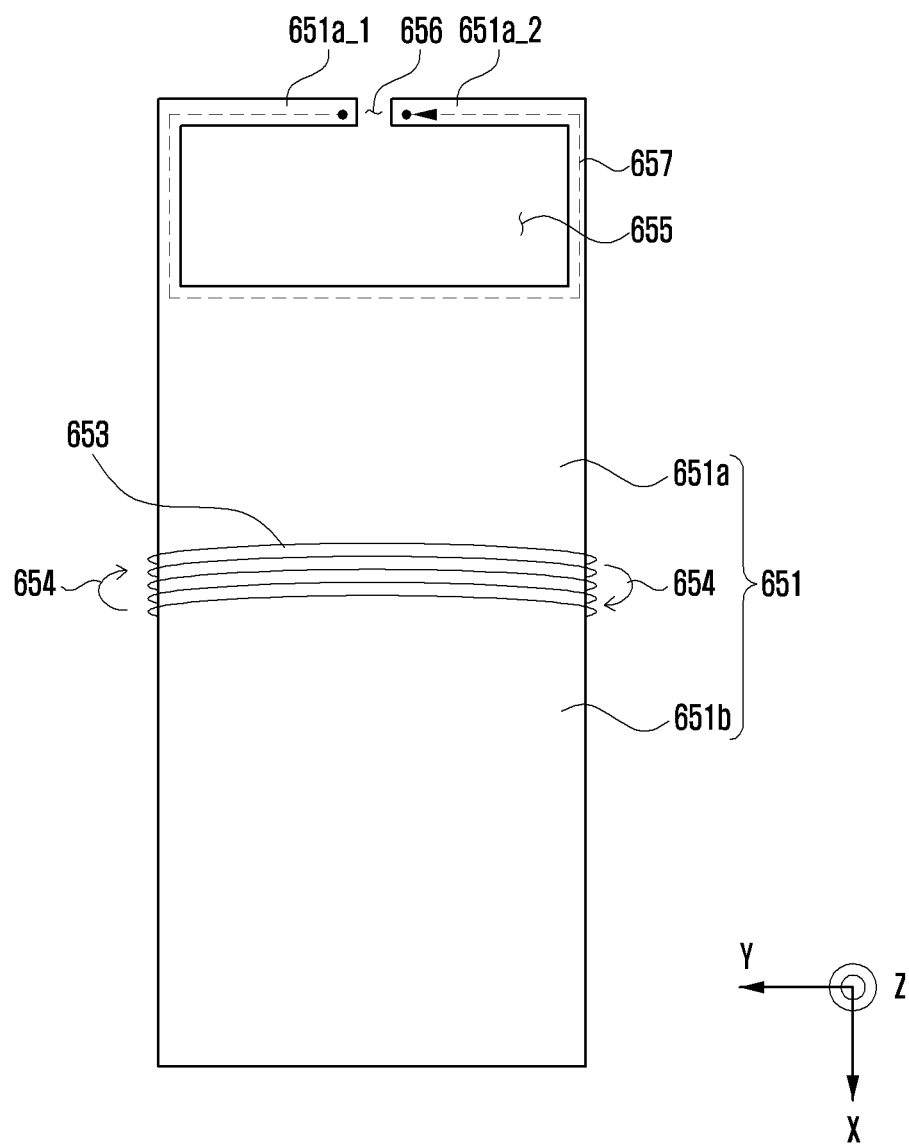
Figure 7A:
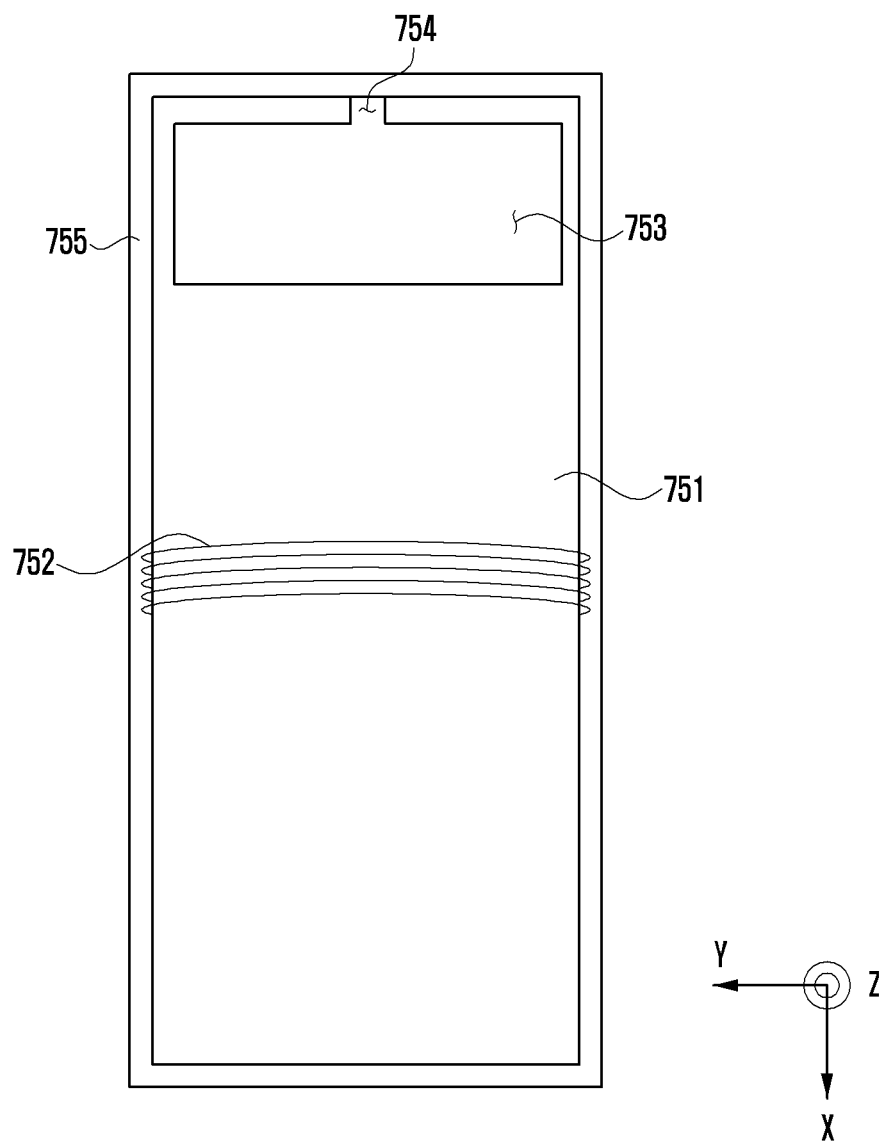
FIGS. 7A, 7B, 7C and 7D are diagrams illustrating examples of various combo type loop antennas according to various example embodiments of the present disclosure.
Figure 7B:
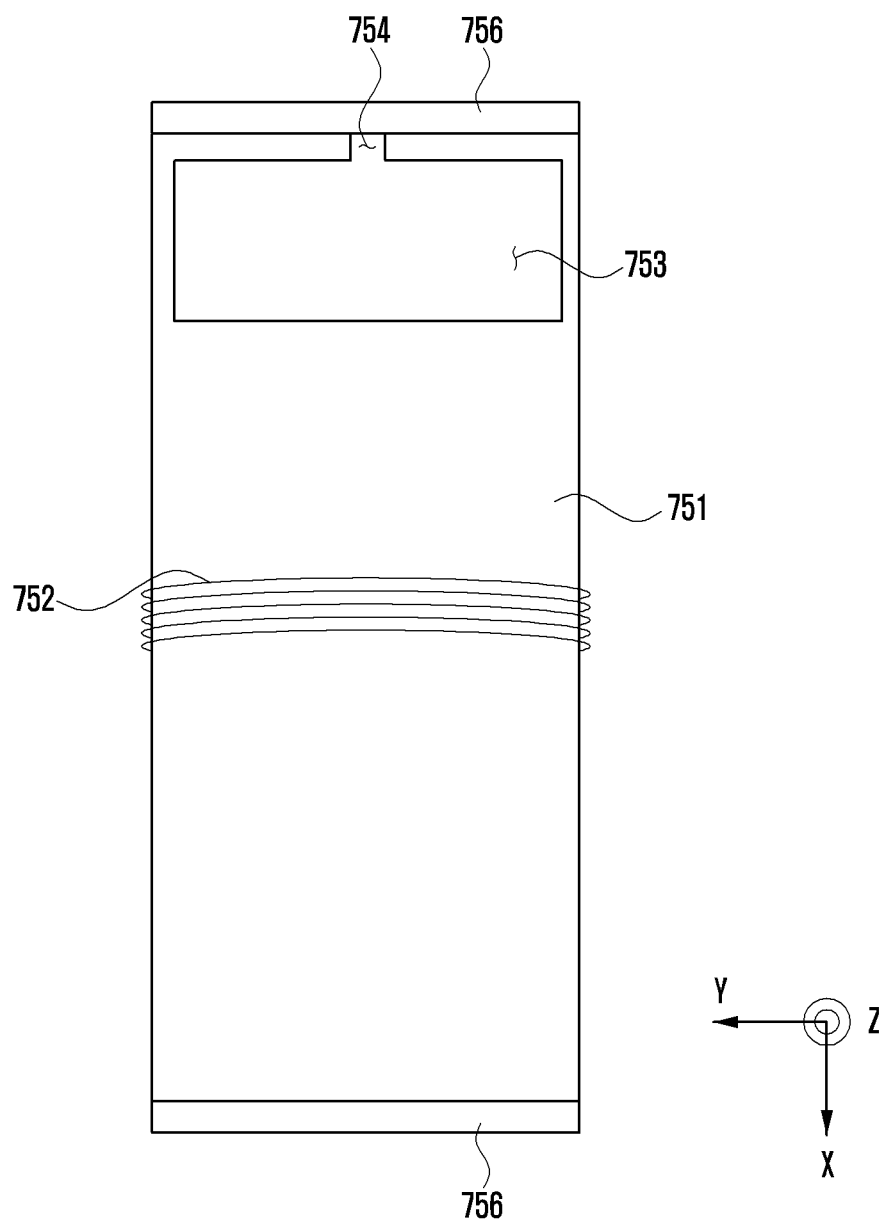
Figure 7C:
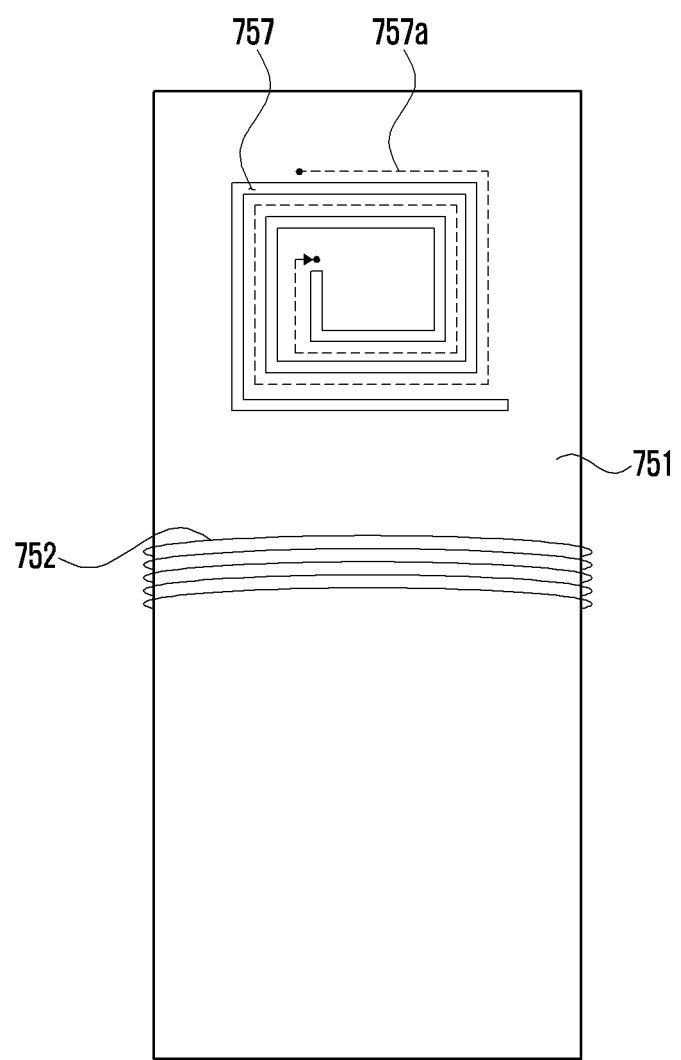
Figure 7D:
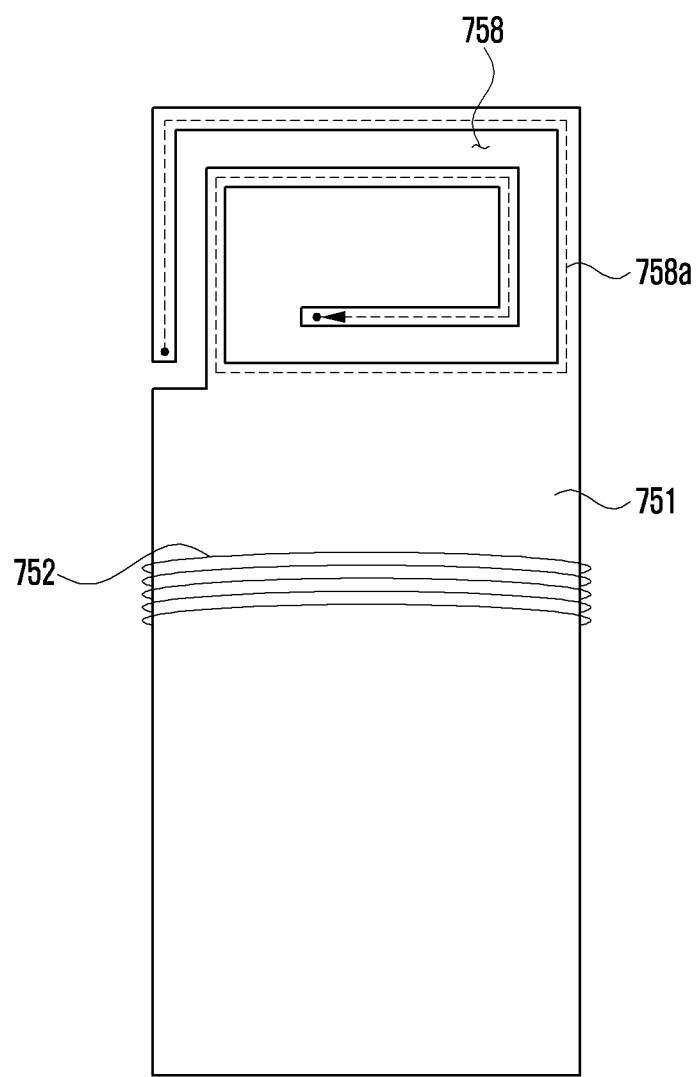

FIGS. 6A, 6B and 6C are diagrams illustrating an example electronic device having a flat type and solenoid type (combo type) loop antenna according to various example embodiments of the present disclosure. FIG. 6A illustrates a disposition structure of a rear surface of an electronic device and a loop antenna positioned under the rear surface. FIG. 6B illustrates a cross-section of an electronic device. FIG. 6C illustrates a loop antenna positioned under the rear surface.

With reference to FIGS. 6A and 6B, an electronic device (e.g., the electronic device 11) may include various electronic components and a housing for protecting the various electronic components. The housing may include a first surface 610 facing in a first direction and comprising a front surface of the electronic device, a second surface 620 facing in a second direction substantially opposite the first direction and comprising a rear surface of the electronic device, and a side member 630 that encloses at least a portion of a space between the first surface 610 and the second surface 620. A display 641 may be exposed through a portion of the first surface 610. The side member 630 may include a right side cover 631 comprising a right side surface of the electronic device, a left side cover 632 comprising a left side surface of the electronic device, an upper side cover 633 comprising an upper side surface of the electronic device, and a lower side cover 634 comprising a lower side surface of the electronic device.

With reference to FIG. 6A, the second surface 620 may be made of a conductive material (e.g., metal), and an anodizing technique may be used in order to coat a color at the second surface 620. The second surface 620 may be divided into an upper area 621, a central area 622, and a lower area 623. For example, the upper area 621 and the central area 622 may be divided by an upper slit 624 formed in a straight line form in a Y-axis (lateral) direction. Further, the central area 622 and the lower area 623 may be divided by a lower slit 625 formed in a straight line form in a Y-axis (lateral) direction. The second surface 620 (e.g., at least a portion in the upper area 621, the central area 622, and the lower area 623) may be electrically connected to a communication module disposed within the housing to be used as a radiating body. Further, a non-conductive material may be filled in the slits 624 and 625. In the central area 622, in a portion adjacent to the upper slit 624, an opening 626 for exposing a lens of the camera to the outside may be bored. Another slit 627 that connects the opening 626 and the upper slit 624 may be formed between the opening 626 and the upper slit 624 in an X-axis (vertical) direction, and a non-conductive material may be filled in the slit 627.

With reference to FIGS. 6A, 6B, and 6C, the display 641, a support structure 642, a camera 643, a battery 644, a loop antenna 650, a first substrate 661, and a second substrate 662 may be positioned within the housing. When viewed from above the second surface 620, the display 641 may be disposed on the first surface 610, and the support structure 642 configured to support the first surface 610 may be disposed on the display 641. The camera 643, the battery 644, the first substrate 661, and the second substrate 662 may be disposed on the support structure 642. The camera 643 may be disposed under the opening 626 at an internal space of the housing; thus, a lens may be exposed to the outside through the opening 626. Further, an opening may be formed within the first substrate 661 and, as shown in FIG. 6B, the camera 643 may be exposed through the opening. The battery 644 may feed power to various electronic components (e.g., the display 641, the camera 643) configured within the housing and electronic components (e.g., configurations of FIG. 1B) mounted in the first substrate 661 and the second substrate 662.

The loop antenna 650 may be bonded to the second surface 620. Alternatively, an air gap may exist between the loop antenna 650 and the second surface 620. The loop antenna 650 may include a metal plate 651 and a solenoid coil 653.

The loop antenna 650 may be disposed between the upper slit 624 and the lower slit 625. For example, an end portion of the metal plate 651 may be extended adjacent to the upper slit 624, and another end portion thereof may be extended adjacent to the lower slit 625. When viewed from above the second surface 620, the metal plate 651 may have a plane substantially parallel to the first surface 610 or the second surface 620. The metal plate 651 may be configured with a ferromagnetic substance having high permeability, for example, mu-metal (e.g., permalloy, silicon metal, or Fe+Ni) or ferrite. Alternatively, the metal plate 651 may be configured with soft ferrite.

In a portion of the metal plate 651, the solenoid coil 653 may be wound clockwise or counterclockwise; and, for example, in a portion of the metal plate 651, the solenoid coil 653 may be a wire wound several times in an X-axis direction (i.e., direction substantial horizontal to the second substrate 662). Two end portions of the wire may be electrically connected to a communication module (e.g., the MST module 110) mounted in a substrate (e.g., the first substrate 661 or the second substrate 662). The metal plate 651 may operate as a core for increasing a magnetic force generated through the solenoid coil 653. That is, when a current is fed to two end portions of the solenoid coil 653, as illustrated in FIG. 6C, a first current path 654 may be formed clockwise or counterclockwise about an X-axis. A magnetic flux induced by the first current path 654 may be spread to the slits 624 and 625 via the metal plate 651 and be emitted to the outside through the slits 624 and 625.

The solenoid coil 653 may be wound in, for example, a portion of the metal plate 651 positioned above the battery 644; thus, the metal plate 651 may be divided into a first portion 651a adjacent to the upper slit 624 and a second portion 651b relatively adjacent to the lower slit 625 based on a wire.

The first portion 651a may operate as a core of the solenoid coil 653 and form a current path in a direction vertical to a Z-axis, thereby operating as a flat type loop antenna. According to an example embodiment, a first opening 655 may be formed within the first portion 651a and the camera 643 may be exposed through the first opening 655. Further, a second opening 656 extended from the first opening 655 to an end portion adjacent to the upper slit 624 of the first portion 651a may be formed in the first portion 651a. By such a second opening 656, an end portion of the first portion 651a may be separated into a first end portion 651a_1 and a second end portion 651a_2. The first end portion 651a_1 and the second end portion 651a_2 may be electrically connected to a communication module (e.g., NFC module 120) mounted in the substrate (e.g., the first substrate 661 or the second substrate 662). When a current is fed to the first end portion 651a_1 and second end portion 651a_2, as shown in FIG. 6C, a current path 657 may be formed in the first portion 651a. By such a current path 657, a generated magnetic flux of a Z-axis direction may be emitted to the outside through the upper slit 624 and the opening 626.

Although not shown, an opening may be formed within the second portion 651b. Further, an opening extended from such an opening to an end portion adjacent to the lower slit 625 of the second portion 651b may be formed in the second portion 651b. Therefore, the second portion 651b may operate as a flat type loop antenna.

As described above, according to various example embodiments of the present disclosure, a metal plate may operate as a core of a solenoid coil and form a current path. In the following description, a loop antenna having such a metal plate may be referred to as a combo type loop antenna.

FIGS. 7A, 7B, 7C and 7D are diagrams illustrating examples of various combo type loop antennas according to an example embodiment of the present disclosure.

An electronic device according to various example embodiments of the present disclosure may include a structure for lowering heat (or for blocking heat) occurring when a magnetic flux is emitted. For example, with reference to FIG. 7A, a solenoid coil 752 may be wound in a portion of a metal plate 751 (e.g., the metal plate 651 of FIG. 6), and a first opening 753 and a second opening 754 extended from the first opening 753 to an end portion may be formed in another portion thereof. A first heat blocking member 755 may have a structure that encloses an outer edge of such a metal plate 751. In another example, although not shown, a heat blocking member may be positioned above the metal plate 751. In another example, with reference to FIG. 7B, a second heat blocking member 756 may be positioned at an internal space of the electronic device under an upper slit (e.g., the upper slit 624 of FIG. 6) and under a lower slit (e.g., the lower slit 625 of FIG. 6). Further, at the entirety of the upper slit, the lower slit, and a periphery of the conductive pattern, heat blocking members may be disposed. Such a heat blocking member may block or lower heat and any material that has no influence on a magnetic field may be applied to an electronic device according to various example embodiments of the present disclosure.

According to various example embodiments of the present disclosure, in order to form a current path, the metal plate 751 may be designed in various forms. For example, with reference to FIG. 7C, the metal plate 751 may have a first spiral-shaped slit 757 therein instead of the openings 753 and 754 illustrated in FIG. 7A. Further, the metal plate 751 may transmit and receive electric waves of a specific frequency (e.g., NFC frequency) through a current path 757a formed between two points of the metal plate 751 adjacent to the first spiral-shaped slit 757. In another example, with reference to FIG. 7D, a second spiral-shaped slit 758 may be formed within the metal plate 751. The second spiral-shaped slit 758 may be extended from the inside of the metal plate 751 toward an outer edge unlike the first spiral-shaped slit 757.

Figure 8:
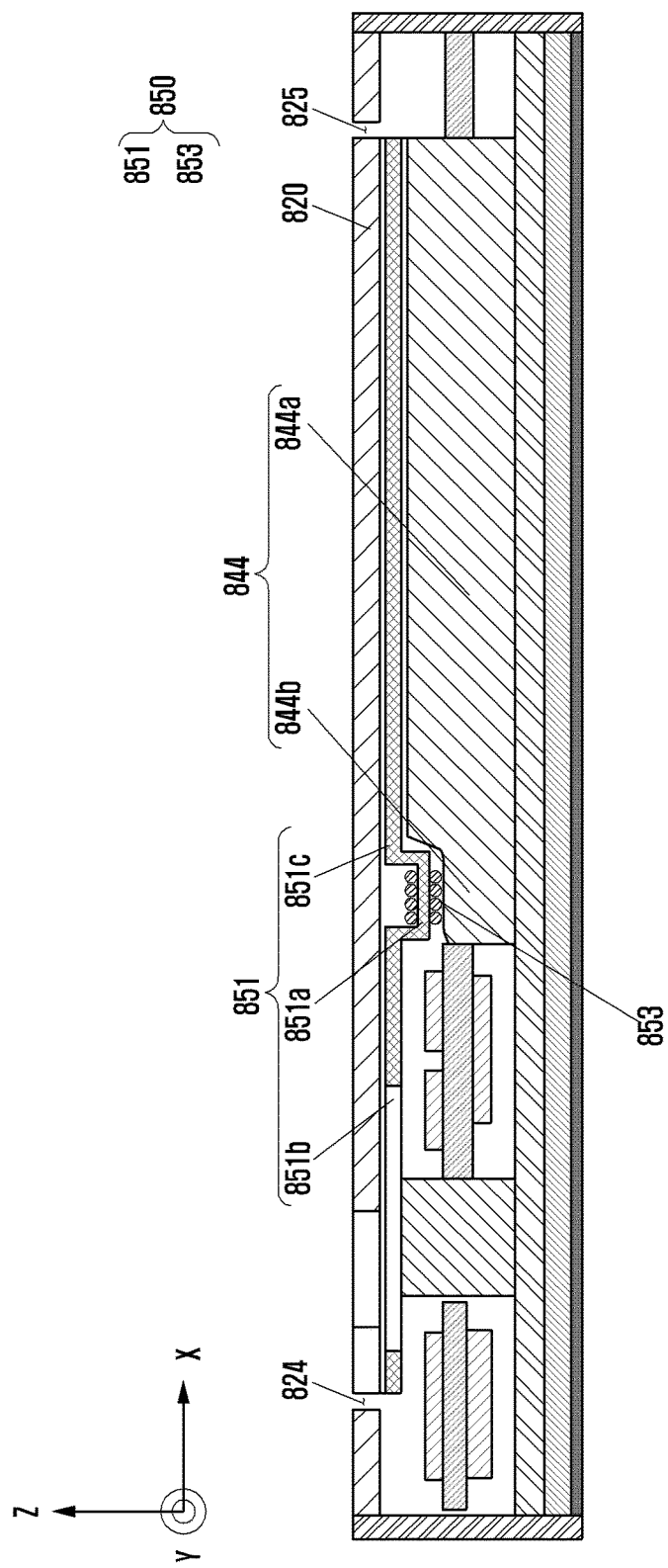
FIG. 8 is a cross-sectional view illustrating an example electronic device having a combo type loop antenna according to various example embodiments of the present disclosure.

FIG. 8 is a cross-sectional view illustrating an example electronic device having a combo type loop antenna according to various example embodiments of the present disclosure.

The electronic device of FIG. 8 may be structurally different from the electronic device of FIG. 6. For example, a battery 844 may be a pouch type and may be divided into a first portion 844a and a second portion 844b. The first portion 844a may include a battery cell, and the second portion 844b may include a protection circuit module (PCM). A thickness of the first portion 844a may be different from that of the second portion 844b. For example, when viewed from above a second surface 820, a lower surface of the second portion 844b and a lower surface of the first portion 844a are flat, but an upper surface of the second portion 844b may be designed to be lower than that of the first portion 844a. Therefore, a space (first space) between the second surface 820 and the second portion 844b may be formed vertically wider than a space (second space) between the second surface 820 and the first portion 844a.

In the foregoing description, the battery 844 of FIG. 8 may be structurally different from the battery 644 of FIG. 6. Therefore, a structure of the loop antenna 850 disposed above the battery 844 may be also designed differently from that of the loop antenna 650 of FIG. 6. For example, a metal plate 851 may be divided into a first portion 851a in which a solenoid coil 853 is wound, a second portion 851b extended from the first portion 851a to an upper slit 824, and a third portion 851c extended from the first portion 851a to a lower slit 825. When viewed from above the second surface 820, the first portion 851a may be designed to be lower than other portions 851b and 851c to be positioned at the second space. That is, the first portion 851a may be bent downward. According to such a design, a wire may be intensively wound at the first portion 851a positioned at the second space; thus, a wire may be wound without increase in a thickness of the electronic device. When a clearance exists in the space or when a restriction does not exist in the space, a wire may be wound in another portion instead of the first portion 851a.

Figure 9:
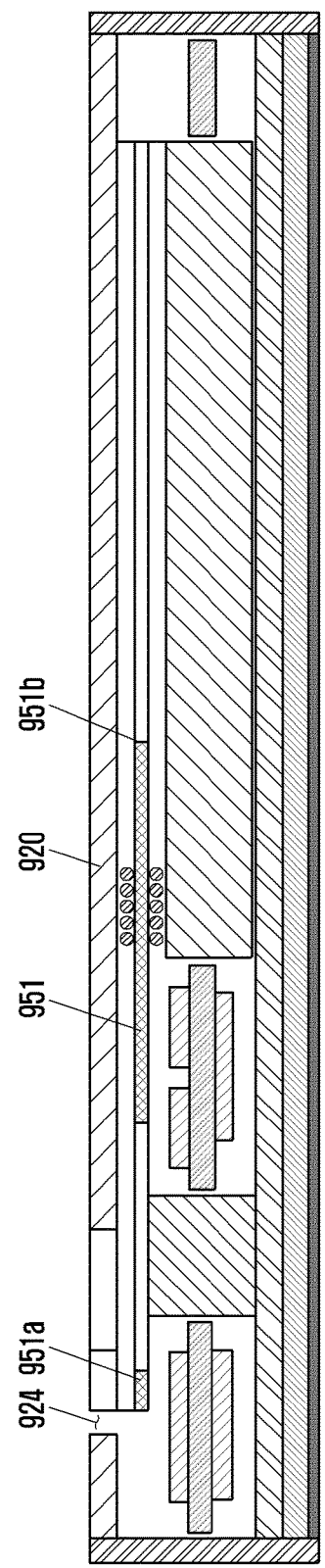
FIG. 9 is a cross-sectional view illustrating an example electronic device having a combo type loop antenna according to various example embodiments of the present disclosure.

FIG. 9 is a cross-sectional view illustrating an example electronic device having a combo type loop antenna according to various example embodiments of the present disclosure.

FIG. 9 illustrates a structure of the electronic device different from that of FIG. 6; and, for example, in a second surface 920, an upper slit 924 may be formed without a lower slit. Therefore, a structure of a loop antenna shown in FIG. 9 may be also designed different from the loop antenna 650 of FIG. 6. For example, in the loop antenna, one of functions of the metal plate is to spread a magnetic flux generated through a solenoid coil to the slit; and, as shown in FIG. 9, an end portion 951a of a metal plate 951 may be extended adjacent to the upper slit 924, and another end portion 951b thereof may have a length smaller than that of the metal plate 651 of FIG. 6. That is, a length of the metal plate 951 may be more flexibly and freely designed. When only a lower slit (not shown) is formed at the second surface 920 without the upper slit 924, another end portion 951b of the metal plate 951 may be extended adjacent to the lower slit, and a length of the end portion 951a may be relatively more flexibly and freely designed.

Figure 10:
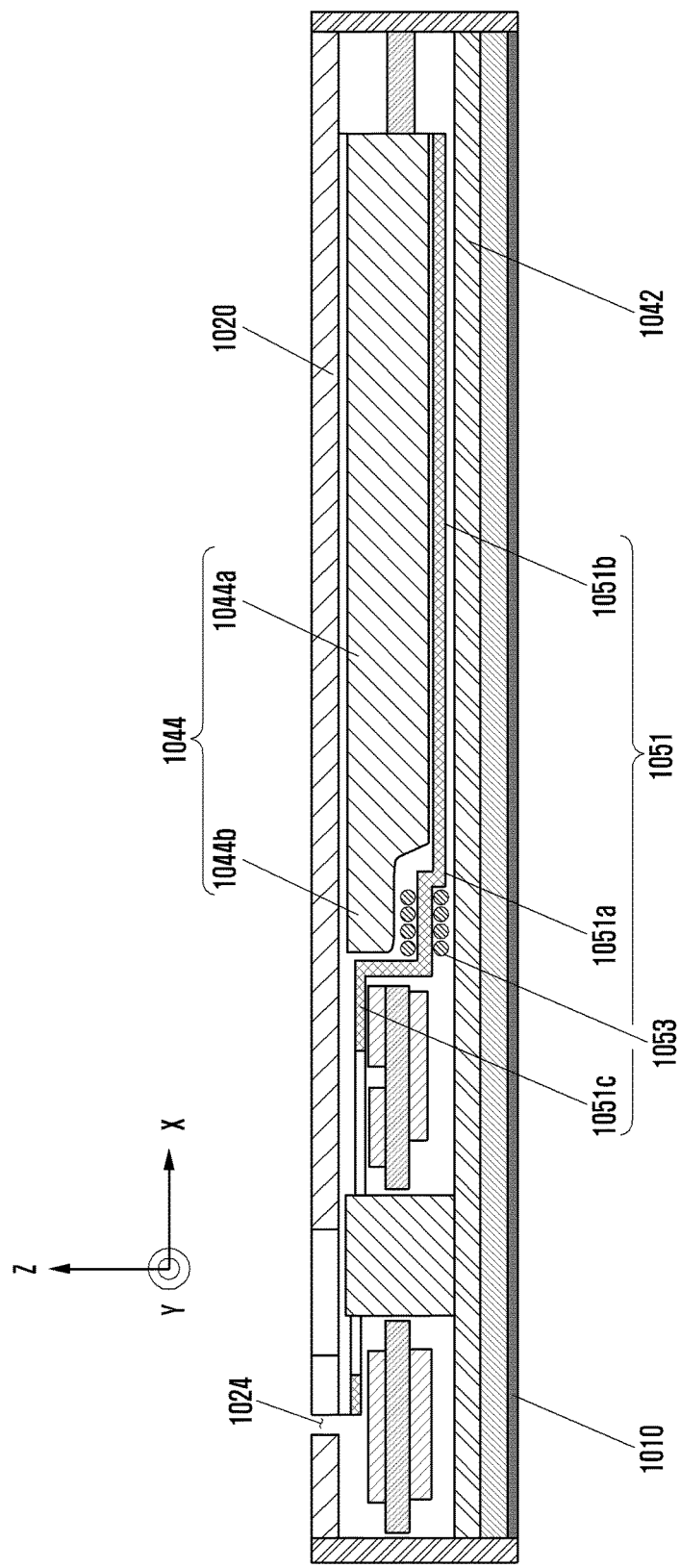
FIG. 10 is a cross-sectional view illustrating an example electronic device having a combo type loop antenna according to various example embodiments of the present disclosure.

FIG. 10 is a cross-sectional view illustrating an example electronic device having a combo type loop antenna according to various example embodiments of the present disclosure.

According to an example embodiment, a battery 1044 may be installed within the electronic device in a structure different from that of the battery 844 of FIG. 8. For example, the battery 1044 may include a first portion 1044a including a battery cell and a second portion 1044b including a protection circuit module. The first portion 1044a and the second portion 1044b may have different thicknesses; and, as illustrated in FIG. 10, the first portion 1044a may have a thickness larger than that of the second portion 1044b.

When viewed from above the first surface 1010, the second portion 1044b may be designed to be lower than the first portion 1044a. That is, the battery 1044 may be disposed in an overturned form of the battery 844 of FIG. 8. Therefore, a space in which a solenoid coil 1053 is to be positioned may not exist between a second surface 1020 and the battery 1044. Alternatively, a space in which the solenoid coil 1053 is to be positioned may be formed between a support structure 1042 and the battery 1044. For example, a space (first space) may be formed between the first portion 1044a and the support structure 1042, and a space (second space) vertically wider than the first space may be formed between the second portion 1044b and the support structure 1042. Therefore, in a metal plate 1051, a first portion 1051a in which the solenoid coil 1053 is wound may be positioned at the second space, and a second portion 1051b may be positioned at the first space. Therefore, when viewed from above the second surface 1020, the first portion 1051a may be extended from the second portion 1051b and be bent upward. Further, a third portion 1051c may be extended from the first portion 1051a to an upper slit 1024. According to such a design, a wire may be intensively wound in the first portion 1051a positioned at the second space; thus, increase in a thickness of the electronic device because of winding of a wire may be minimized and/or reduced.

Figure 11:
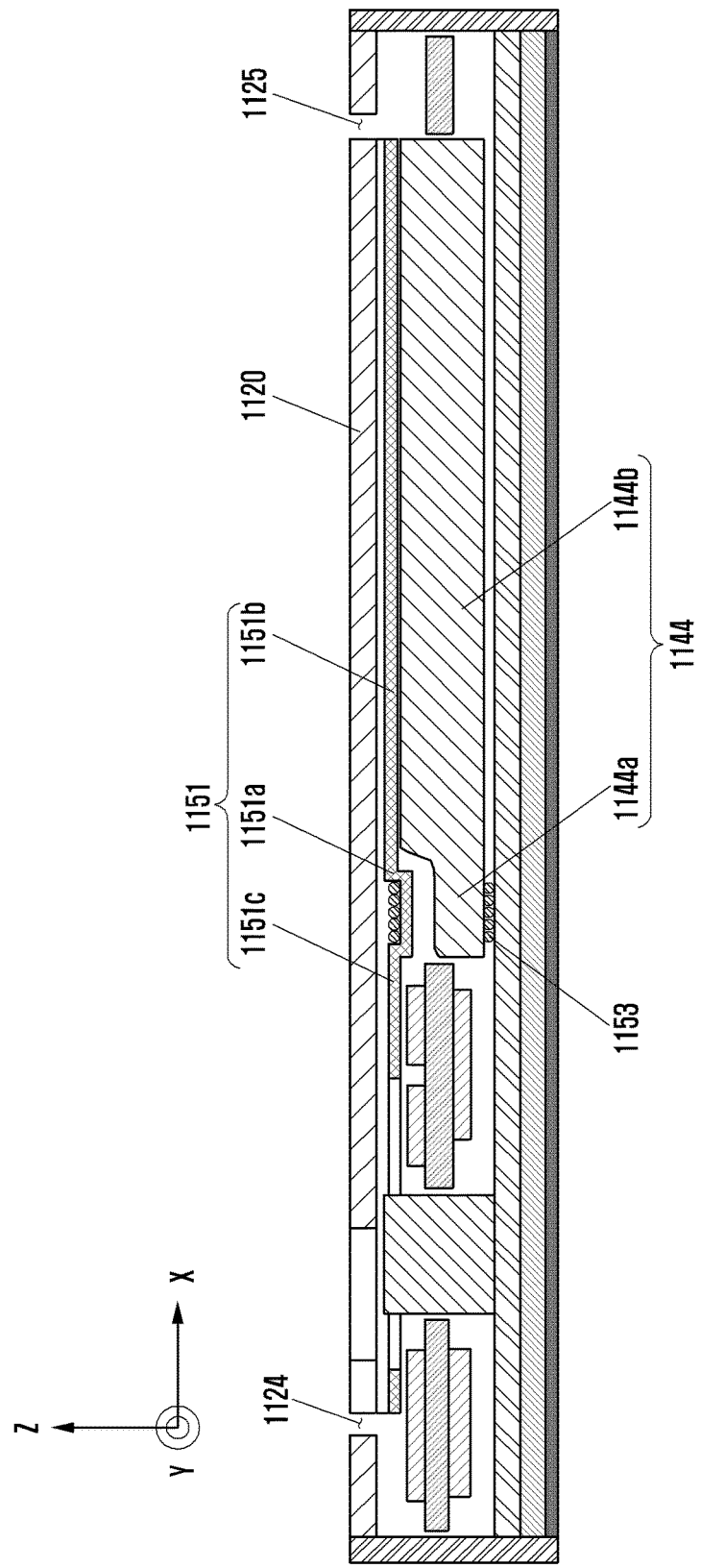
FIG. 11 is a cross-sectional view illustrating an example electronic device having a combo type loop antenna according to various example embodiments of the present disclosure.

FIG. 11 is a cross-sectional view illustrating an example electronic device having a combo type loop antenna according to various example embodiments of the present disclosure.

With reference to FIG. 11, a metal plate 1151 may be divided into a first portion 1151a, a second portion 1151b extended from the first portion 1151a to a lower slit 1125, and a third portion 1151c extended from the first portion 1151a to an upper slit 1124. When viewed from above a second surface 1120, the first portion 1151a may be designed to be lower than other portions 1151b and 1151c and be positioned above a portion 1144a of a battery 1144. Here, the portion 1144a of the battery 1144 may be designed to be lower than another portion 1144b when viewed from above a second surface 1120.

A solenoid coil 1153 may be wound in the first portion 1151a of the metal plate 1151 and the portion 1144a of the battery 1144 in one direction (clockwise or counterclockwise) (e.g., a coil may not be separately wound in the first portion 1151a of the metal plate 1151 and the portion 1144a of the battery 1144). A structure that weaves and winds the solenoid coil 1153 together with the battery 1144 and the metal plate 1151 may solve a problem that it is difficult to wind the solenoid coil 1153 because of the weak rigidity of ferrite or thin thickness of the metal plate 1151. The metal plate 1151 may be attached to the battery 1144 by an adhesive and be integrally formed with the battery 1144. In addition, a configuration and a structure of the electronic device are substantially the same as those of the electronic device of FIG. 6; therefore, a detailed description thereof may be omitted.

Figure 12A:
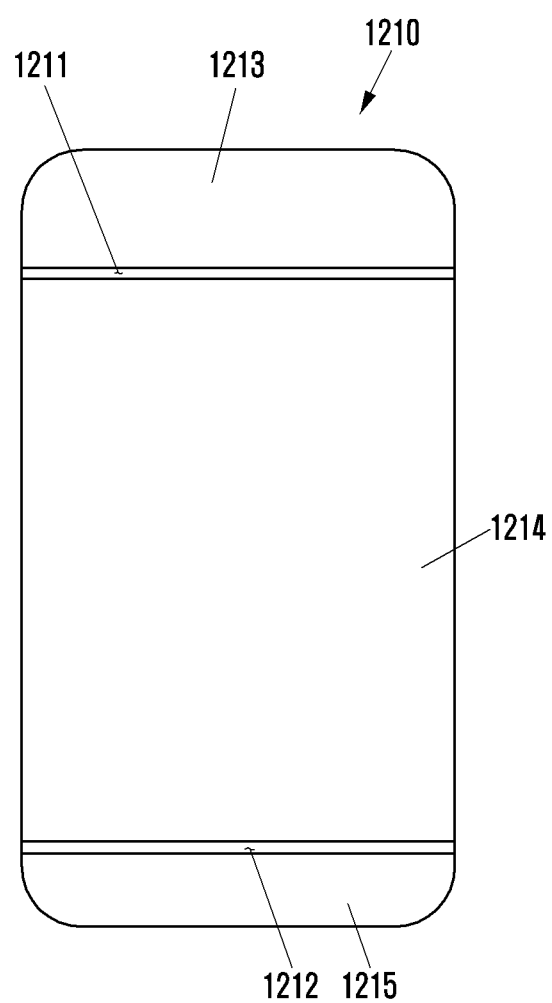
FIGS. 12A, 12B and 12C are diagrams illustrating an example electronic device having a combo type loop antenna according to various example embodiments of the present disclosure.
Figure 12B:
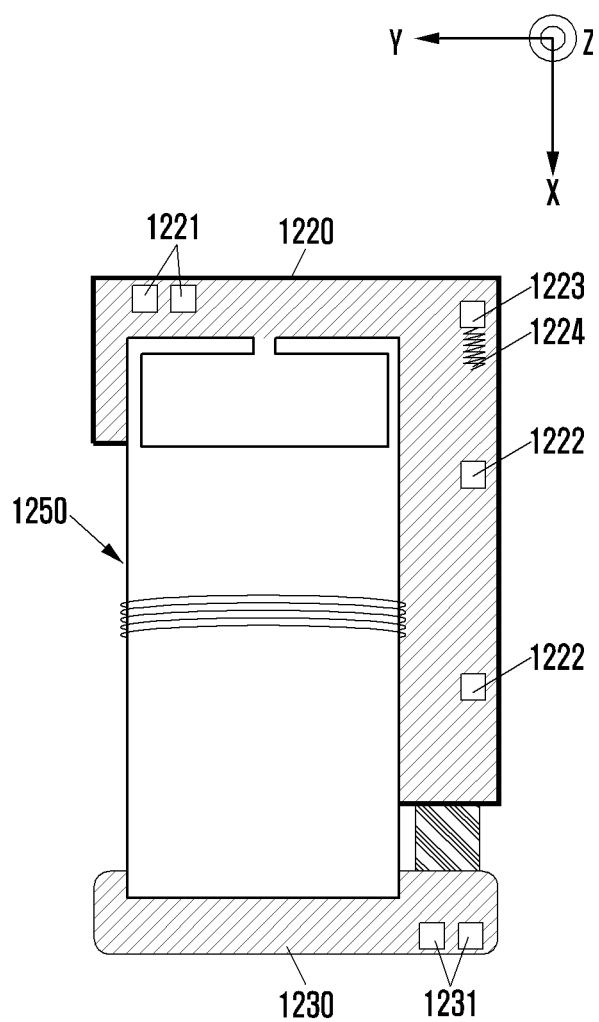
Figure 12C:
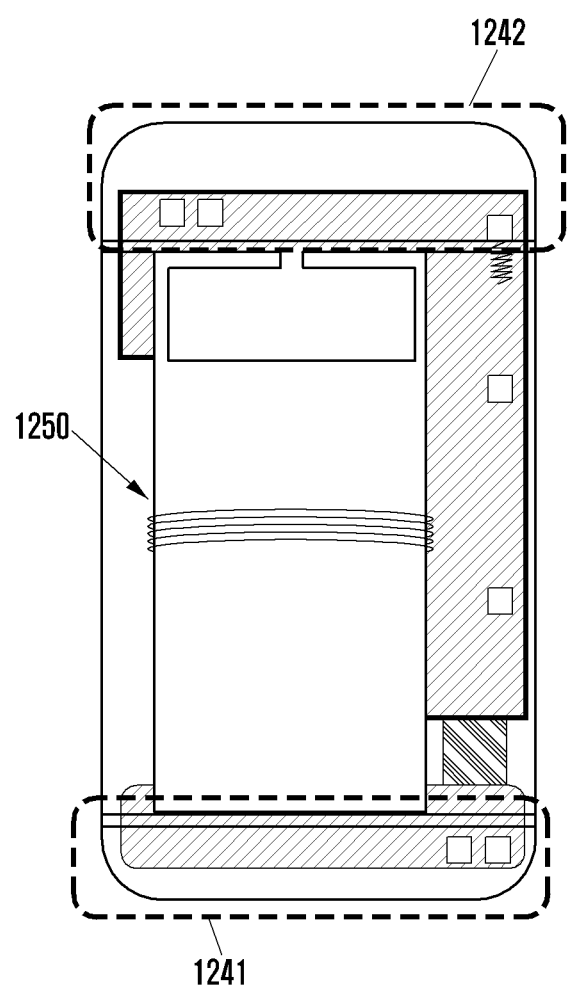

FIGS. 12A, 12B and 12C are diagrams illustrating an example electronic device having a combo type loop antenna according to various example embodiments of the present disclosure. FIG. 12A illustrates a rear surface of the electronic device, FIG. 12B illustrates internal configurations disposed under a rear surface, and FIG. 12C illustrates both a rear surface and internal configurations.

With reference to FIG. 12A, a cover 1210 may configure a rear surface of the electronic device, may be made of a conductive material, and may be divided into an upper area 1213, central area 1214, and lower area 1215 by an upper slit 1211 and a lower slit 1212.

With reference to FIGS. 12B and 12C, a combo type loop antenna 1250 may be disposed between the upper slit 1211 and the lower slit 1212. The upper area 1213 may be electrically connected to a first power supply point 1221 formed at a first substrate 1220 disposed thereunder, the central area 1214 may be electrically connected to the ground 1222 of the first substrate 1220, and the lower area 1215 may be electrically connected to a second power supply point 1231 formed at a second substrate 1230. Therefore, the lower area 1215 may operate as a first antenna 1241, and the upper area 1213 may operate as a second antenna 1242. Additionally, the upper area 1213 may be electrically connected to a power supply coil 1224 through a third power supply point 1223 formed at the first substrate 1220 to operate as another antenna.

Figure 13:
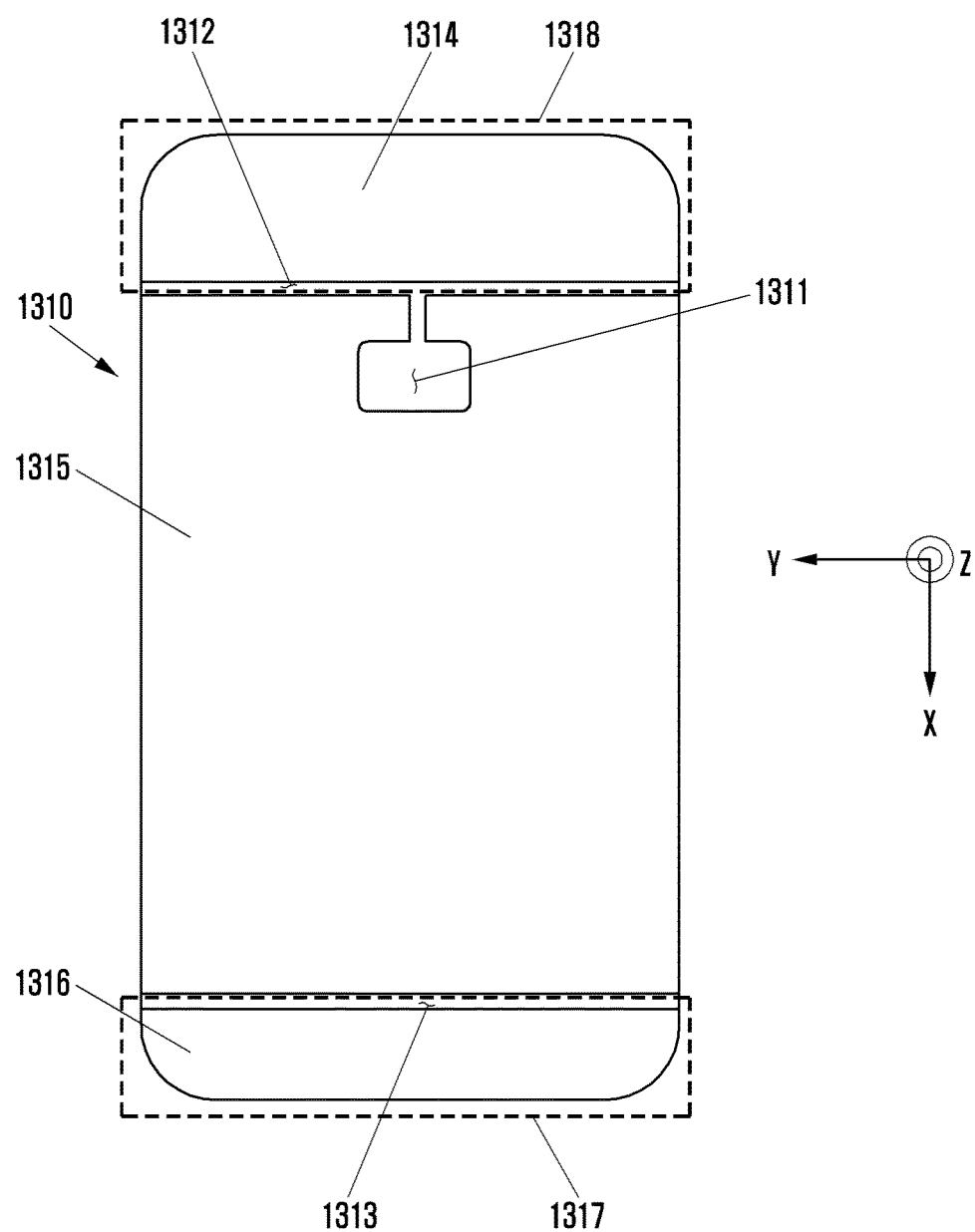
FIG. 13 is a diagram illustrating a rear surface of an example electronic device having a combo type loop antenna according to various example embodiments of the present disclosure.

FIG. 13 is a diagram illustrating a rear surface of an example electronic device having a combo type loop antenna according to various example embodiments of the present disclosure.

With reference to FIG. 13, according to an example embodiment, a cover 1310 may configure a rear surface of the electronic device and may be made of a conductive material. The cover 1310 may have an opening 1311 in which an optical sensor (camera, PPG sensor) may be disposed. The cover 1310 may be divided into an upper area 1314, central area 1315, and lower area 1316 by an upper slit 1312 and a lower slit 1313. The upper slit 1312 may be connected to the opening 1311 to have a "T" shape. The upper area 1314 may be electrically connected to a power supply point formed at a substrate (e.g., the first substrate 1220) disposed thereunder, the central area 1315 may be electrically connected to the ground of the substrate, and the lower area 1316 may be electrically connected to another power supply point formed in a substrate (e.g., the second substrate 1230). Therefore, the lower area 1316 may operate as a first antenna 1317, and the upper area 1314 may operate as a second antenna 1318.

Figure 14A:
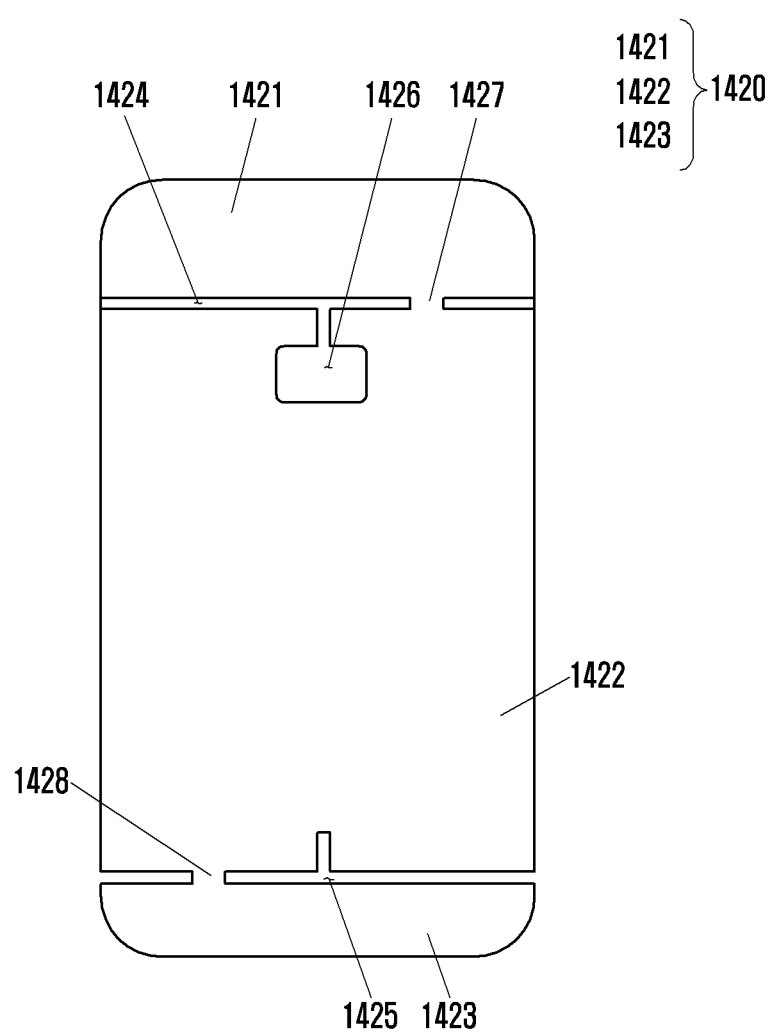
FIGS. 14A, 14B and 14C are diagrams illustrating an example electronic device having a combo type loop antenna according to various example embodiments of the present disclosure.
Figure 14B:
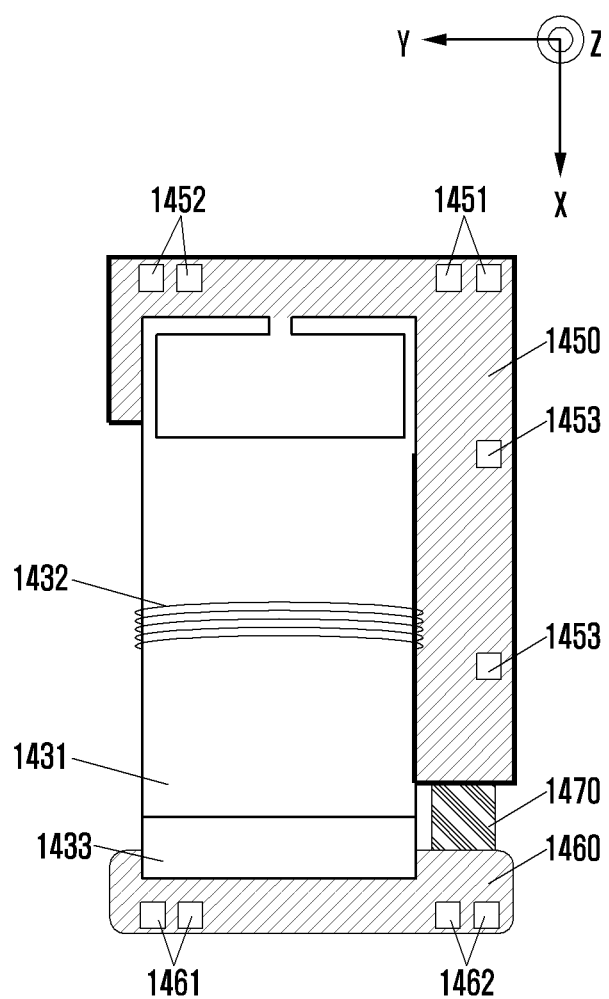
Figure 14C:
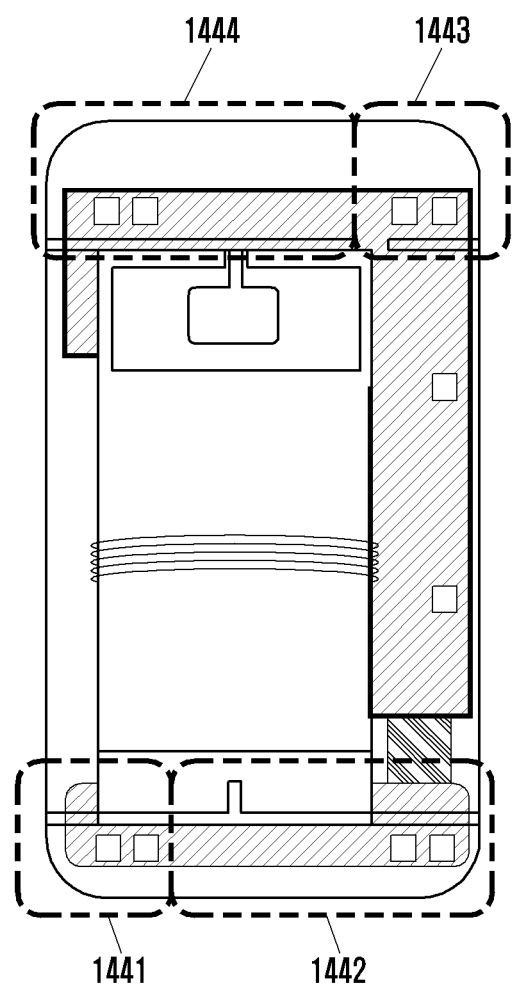

FIGS. 14A, 14B and 14C are diagrams illustrating an example electronic device having a combo type loop antenna according to various example embodiments of the present disclosure. FIG. 14A illustrates a rear surface of an electronic device, FIG. 14B illustrates internal configurations disposed under a rear surface, and FIG. 14C illustrates both a rear surface and internal configurations.

With reference to FIG. 14A, a cover 1420 may configure a rear surface of the electronic device and may be made of a conductive material. The cover 1420 may have an opening 1426 in which an optical sensor (camera, PPG sensor) may be disposed and may be divided into an upper area 1421, central area 1422, and lower area 1423 by an upper slit 1424 and a lower slit 1425. The upper slit 1424 may be extended by a predetermined length toward the lower end of the cover 1420, i.e., the opening 1426, to have a "T" shape, as shown in FIG. 14A. To be symmetrical thereto, the lower slit 1425 may be extended by a predetermined length toward the upper end of the cover 1420 to have a "T" shape. The upper area 1421 and the central area 1422 may be electrically connected by a first connection portion 1427, and the central area 1422 and the lower area 1423 may be electrically connected by a second connection portion 1428.

With reference to FIGS. 14B and 14C, a first metal plate 1431 may be disposed between the upper slit 1424 and the lower slit 1425, and a solenoid coil 1432 may be wound in a portion thereof. A magnetic flux generated by the solenoid coil 1432 may be spread to both sides of the upper slit 1424 and the lower slit 1425 through the first metal plate 1431 to be emitted to the outside of the terminal. A battery (not shown) may be positioned under the first metal plate 1431. The first metal plate 1431 may be designed to form a current path and may operate as a flat type loop antenna.

An end portion of the first metal plate 1431 may not arrive at the lower slit 1425. Accordingly, a vortex occurs in the cover 1420 or the internal conductive component; thus, emission efficiency of a magnetic flux generated by the solenoid coil 1432 may be lower than a desired reference value. Therefore, a second metal plate 1433 may be attached adjacent to (or contact) an end portion of the first metal plate 1431; thus, occurrence of a vortex may be reduced and a magnetic flux may be smoothly spread toward a slit. The second metal plate 1433 may be used as a radiating body of another communication method. For example, the first metal plate 1431 may be used as a radiating body for NFC and MST. The second metal plate 1433 may be used as a radiating body for wireless charge. That is, the second metal plate 1433 may be disposed adjacent to the lower slit 1425; thus, a magnetic flux generated in the second metal plate 1433 may be emitted to the outside through the lower slit 1425.

The first metal plate 1431 may have permeability different from that of the second metal plate 1433. For example, the first metal plate 1431 may be used for MST and NFC and the second metal plate 1433 may be used for wireless charge; thus, each operation frequency may be different (e.g., operation frequency for NFC is 13.56 MHz, operation frequency for wireless charge by an induction method is 100 KHz-205 KHz, operation frequency for wireless charge by a resonant method is 6.78 MHz-13.56 MHz, operation frequency for MST is 100 KHz or less); thus, metal plates may have different permeability. Although use thereof is different, the second metal plate 1433 spreads a magnetic flux from the first metal plate 1431 to the slit, thereby enhancing a performance of MST.

According to an example embodiment, in the cover 1420, a lower portion of the lower slit 1425 may be used as an antenna. For example, a left side portion of the second connection portion 1428 may operate as a first antenna 1441, and a right side portion thereof may operate as a second antenna 1442. The first antenna 1441 and the second antenna 1442 each may be electrically connected to a second substrate 1460, receive and emit a signal from a communication circuit through a first power supply point 1461 and a second power supply point 1462 disposed at the second substrate 1460, and receive a wireless signal to transfer the wireless signal to the communication circuit through the first power supply point 1461 and the second power supply point 1462. The first antenna 1441 and the second antenna 1442 may operate as a main antenna that transmits and receives a signal. A frequency supported by the first antenna 1441 supports may be higher than a frequency supported by the second antenna 1442. For example, the first antenna 1441 may support 1.6 GHz-5 GHz, and the second antenna 1442 may support 600 MHz-2 GHz.

In the cover 1420, an upper portion of the upper slit 1424 may be used as an antenna. For example, a right side portion of the first connection portion 1427 may operate as a third antenna 1443, and a left side portion thereof may operate as a fourth antenna 1444. The third antenna 1443 and the fourth antenna 1444 each may be electrically connected to a first substrate 1450 and may receive and emit a signal from a communication circuit through a third power supply point 1451 and a fourth power supply point 1452 disposed at the first substrate 1450 to receive a wireless signal to transfer the wireless signal to a circuit through the third power supply point 1451 and the fourth power supply point 1452. The third antenna 1443 and the fourth antenna 1444 may operate as a diversity antenna that receives a signal. A frequency supported by the third antenna 1443 may be higher than a frequency supported by the fourth antenna 1444. For example, the third antenna 1443 may support 1.6 GHz-5 GHz, and the fourth antenna 1444 may support 600 MHz-2 GHz.

The first connection portion 1427 and the second connection portion 1428 may be disposed at opposite positions based on an X-axis. Each of the pair of the first antenna 1441 and the third antenna 1443, which support a similar frequency, and of the second antenna 1442 and the fourth antenna 1444, which support a similar frequency, may be positioned at a diagonal line to increase isolation between antennas and to lower a correlation in signal transmission and reception.

In the cover 1420, the central area 1422 between slits may be electrically connected to the ground 1453 of the first substrate 1450. In order to prevent an electric shock, the ground 1453 may be connected to the central area 1422 through a capacitor. A performance of the antenna can be enhanced through the ground 1453 and a shield effect of noise can be enhanced.

A height of the first substrate 1450 may be different from that of the second substrate 1460. The first substrate 1450 and the second substrate 1460 may be connected to an FPCB 1470. The second substrate 1460 may be disposed at a position lower than that of the first substrate 1450, and a distance between the second substrate 1460 and the first and second antennas 1441 and 1442 at a Z-axis may larger than that between the first substrate 1450 and the first and second antennas 1441 and 1442. As a distance between the second substrate 1460 and the first and second antennas 1441 and 1442 increases, a performance of the first and second antennas 1441 and 1442 can be enhanced. A circuit of the first substrate 1450 and a power supply module of the second substrate 1460 may be connected through a coaxial line.

Figure 15A:
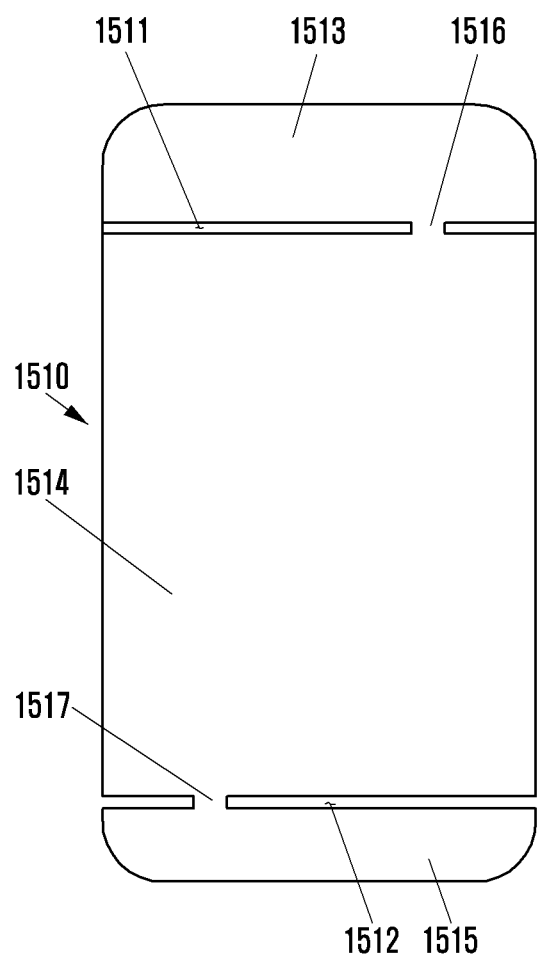
FIGS. 15A, 15B and 15C are diagrams illustrating an example electronic device having a combo type loop antenna according to various example embodiments of the present disclosure.
Figure 15B:
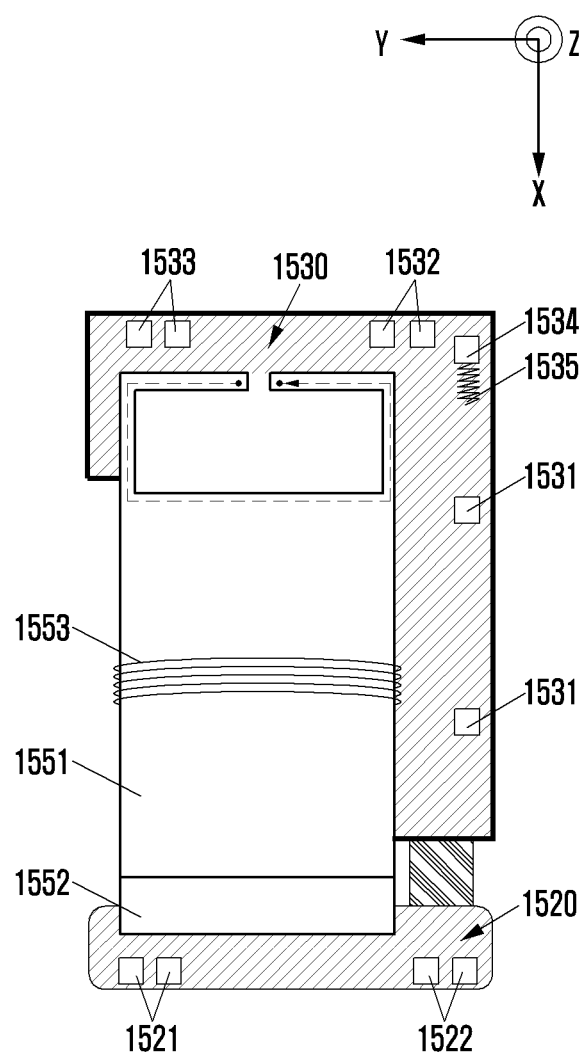
Figure 15C:
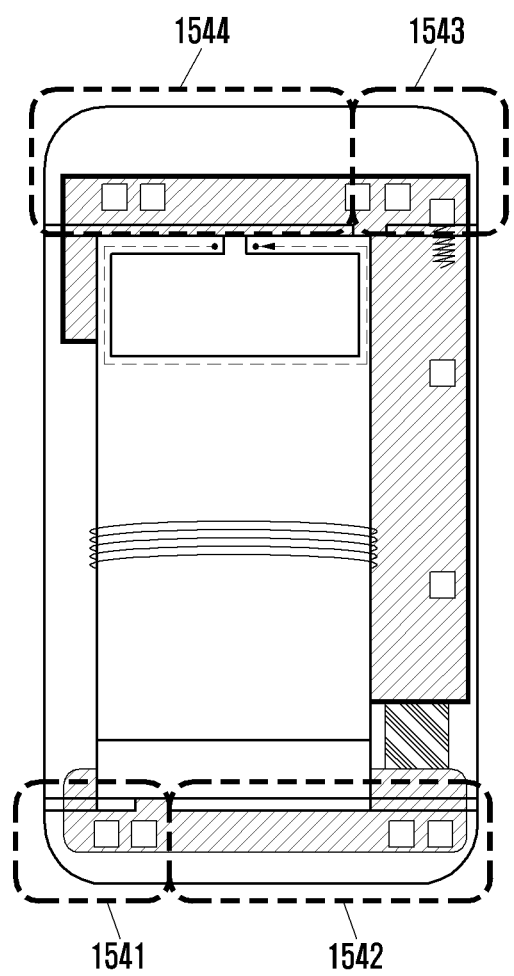

FIGS. 15A, 15B and 15C are diagrams illustrating an example electronic device having a combo type loop antenna according to various example embodiments of the present disclosure. FIG. 15A illustrates a rear surface of the electronic device, FIG. 15B illustrates internal configurations disposed under a rear surface, and FIG. 15C illustrates both a rear surface and internal configurations.

With reference to FIG. 15A, a cover 1510 may configure a rear surface of the electronic device and may be made of a conductive material. The cover 1510 may be divided into an upper area 1513, central area 1514, and lower area 1515 by an upper slit 1511 and a lower slit 1512. The upper area 1513 and the central area 1514 may be electrically connected by a first connection portion 1516, and the central area 1514 and the lower area 1515 may be electrically connected by a second connection portion 1517.

With reference to FIGS. 15B and 15C, in the lower area 1515, a left side portion of the second connection portion 1517 may be electrically connected to a first power supply point 1521 formed in a second substrate 1520 disposed thereunder to operate as a first antenna 1541, and a right side portion thereof may be electrically connected to a second power supply point 1522 formed in the second substrate 1520 to operate as a second antenna 1542. The central area 1514 may be electrically connected to the ground 1531 of a first substrate 1530. In the upper area 1513, a right side portion of the first connection portion 1516 may be electrically connected to a third power supply point 1532 formed in the first substrate 1530 disposed thereunder to operate as a third antenna 1543, and a left side portion thereof may be electrically connected to a fourth power supply point 1533 formed in the first substrate 1530 to operate as a fourth antenna 1544. Additionally, the right side portion of the first connection portion 1516 may be electrically connected to a power supply coil 1535 (e.g., an inductor) through a fifth power supply point 1534 formed in the first substrate 1530. Therefore, the right side portion of the first connection portion 1516 may operate as another antenna. Such a configuration (the fifth power supply point 1534 and the power supply coil 1535) and operation according thereto may be equally implemented even in the electronic device of FIG. 14 or the electronic device of FIG. 13. As shown in FIGS. 15B and 15C, the upper end of a first metal plate 1551 may be extended to the upper slit 1511. The lower end of the first metal plate 1551 may not reach the lower slit 1512, but a second metal plate 1552 is disposed between the lower end and the lower slit 1512; thus, a magnetic flux generated in a solenoid coil 1553 may be spread to the lower slit 1512 through the second metal plate 1552. Further, the first metal plate 1551 may be designed to form a current path to operate as a flat type loop antenna.

Figure 16A:
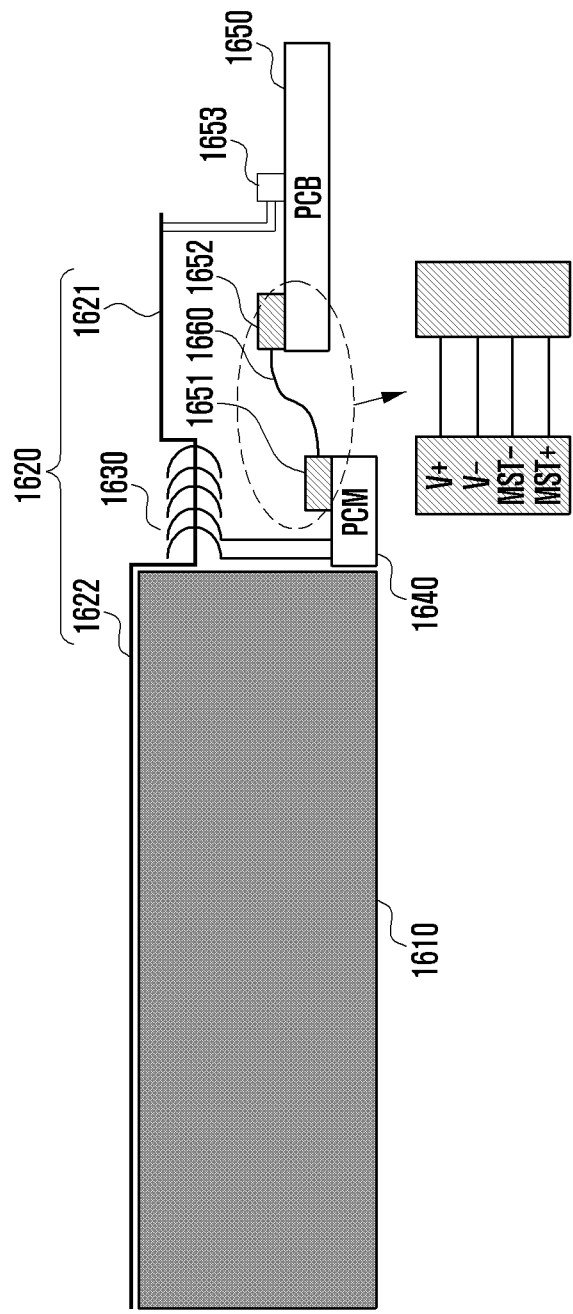
FIGS. 16A and 16B are diagrams illustrating an example connection between a combo type loop antenna and a substrate in an electronic device according to various example embodiments of the present disclosure.
Figure 16B:
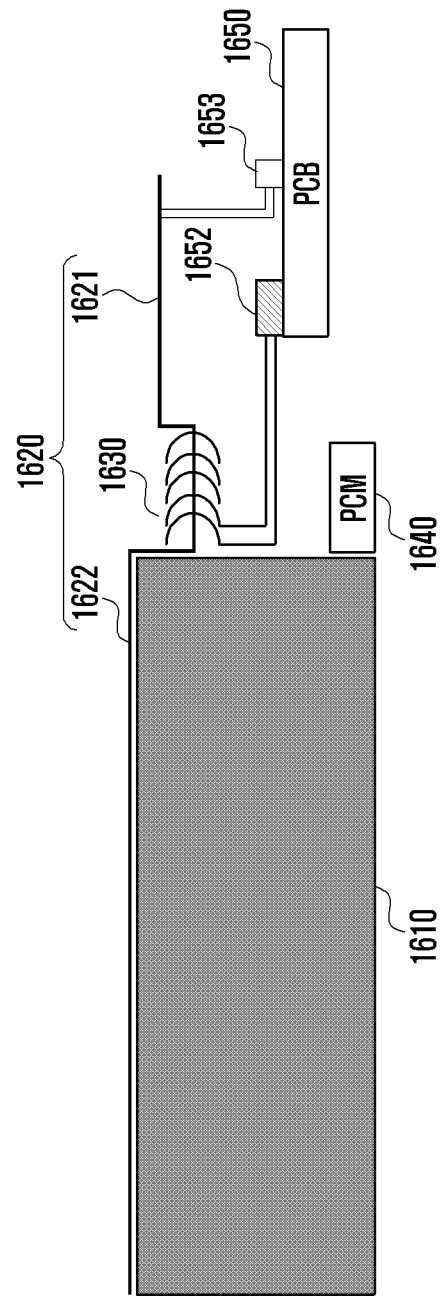

FIGS. 16A and 16B are diagrams illustrating an example connection between a combo type loop antenna and a substrate in an electronic device according to various example embodiments of the present disclosure.

With reference to FIG. 16A, in a portion of a metal plate 1620, a solenoid coil 1630 may be wound. The metal plate 1620 may be divided into a first portion 1621 and a second portion 1622 based on a wound portion, and the second portion 1622 may be disposed at an upper portion of a battery 1610. Both ends of the solenoid coil 1630 may be connected to a first communication circuit 1651 positioned at a PCM 1640. The first communication circuit 1651 and a second communication circuit 1652 (e.g., MST communication circuit) mounted in the PCB 1650 may be connected through a connector cable 1660. The connector cable 1660 may include battery power lines (V+ and V−) and signal lines (MST+ and MST−). The connector cable 1660 may further include a signal line connected to an identification (ID) resistor of the battery 1610. As described above, the first portion 1621 may be designed to form various forms of current paths. In order to form such a current path, two points of the first portion 1621 may be electrically connected to a third communication circuit 1653 (e.g., NFC communication circuit) mounted on the PCB 1650.

With reference to FIG. 16B, the solenoid coil 1630 may be directly connected to the second communication circuit 1652 without connection through the PCM 1640.

An electronic device according to various example embodiments of the present disclosure includes a housing including a first surface facing in a first direction, a second surface facing in a second direction opposite the first direction, and a side member that encloses at least a portion of a space between the first surface and the second surface; a first metal plate positioned between the first surface and the second surface; a conductive coil positioned within the housing, having a shaft substantially vertical to the first direction or the second direction, and that winds the first metal plate; a first communication circuit positioned within the housing and electrically connected to the conductive coil; a second communication circuit positioned within the housing and electrically connected to the first metal plate; a display exposed through at least a portion of the first surface; and a processor positioned within the housing and electrically connected to the first communication circuit, the second communication circuit, and the display. The second surface may include a first portion comprising a conductive material and that includes a first opening and a second portion comprising a non-conductive material and that fills the first opening. The conductive coil may be positioned under the first portion when viewed from above the second surface. A portion of the first metal plate may be wound with the conductive coil, and another portion of the first metal plate may be electrically connected to the second communication circuit. The another portion may be extended to the first opening when viewed from above the second surface. A first magnetic flux may be generated in the conductive coil by the first communication circuit. A second magnetic flux advancing in a direction vertical to an advancing direction of the first magnetic flux may be generated by the second communication circuit in the another portion of the first metal plate.

In the first metal plate, the another portion may include an opening for induction of the second magnetic flux.

The opening for induction of the second magnetic flux may be a spiral-shaped slit formed within the another portion in the first metal plate.

The first metal plate may include a plane substantially parallel to the first surface or the second surface.

The first metal plate may include a plate made of a magnetic body.

The electronic device may further include a battery. At least a portion of the plate may be disposed between the second surface and the battery.

In the second surface, the first portion may include a second opening separated from the first opening. The second surface may include a third portion that fills the second opening. In the first metal plate, another portion may be extended to the second opening.

The shaft may be mostly extended in a third direction advancing from the second portion to the third portion when viewed from above the second surface.

The second portion and the third portion may be enclosed by the first portion when viewed from above the second surface.

The openings may be slits formed at the second surface in a straight line form substantially vertical to the shaft.

The battery may include a first battery portion and a second battery portion positioned lower than the first battery portion when viewed from above the second surface. In the portion of the first metal plate, may be bent downward to be positioned above the second battery portion when viewed from above the second surface.

The second battery portion may include a protection circuit of the battery.

The electronic device may further include a second metal plate. In the second surface, the first portion may include a second opening separated from the first opening. The second surface may include a third portion that fills the second opening. An end portion of the second metal plate may contact or may be adjacent to an end portion of the first metal plate and another end portion of the second metal plate may be extended to the second opening.

The second metal plate may be made of a material different from that of the first metal plate.

The first metal plate may be a magnetic body, and the second metal plate may be ferrite.

The first metal plate may be bonded to the second surface.

The battery may include a first portion and a second portion positioned lower than the first portion when viewed from above the first surface. In the portion of the first metal plate may be bent downward to be positioned above the second portion when viewed from above the first surface.

The battery may include a first portion and a second portion positioned lower than the first portion when viewed from above the second surface. In the portion of the first metal plate, may be bent downward to be positioned above the second portion when viewed from above the second surface. The conductive coil may be wound in one direction in the first portion and the portion of the first metal plate.

The electronic device may further include a heat blocking member positioned in at least one location of a location under the first opening and an outer edge of the metal plate.

An electronic device according to various example embodiments of the present disclosure includes a housing including a first surface facing in a first direction, a second surface facing in a second direction opposite the first direction, and a side member that encloses at least a portion of a space between the first surface and the second surface; an internal structure that forms a pattern and positioned between the first surface and the second surface; a conductive coil positioned within the housing, having a shaft substantially vertical to the first direction or the second direction, and that encloses a portion of the internal structure; a first communication circuit positioned within the housing and that enables the conductive coil to generate a magnetic flux; a second communication circuit positioned within the housing and that enables a portion of the conductive coil to generate an electromagnetic signal; a display exposed through at least a portion of the first surface; and a processor positioned within the housing and electrically connected to the communication circuits and the display. The second surface may include a first portion made of a conductive material and including two separated openings; a second portion made of a non-conductive material and that fills one of the openings; and a third portion made of a non-conductive material and that fills another one of the openings. The conductive coil may be mostly positioned under the first portion when viewed from above the second surface. The internal structure may be extended between one and another one of the openings such that the generated magnetic flux penetrates the openings.

Figure 17:
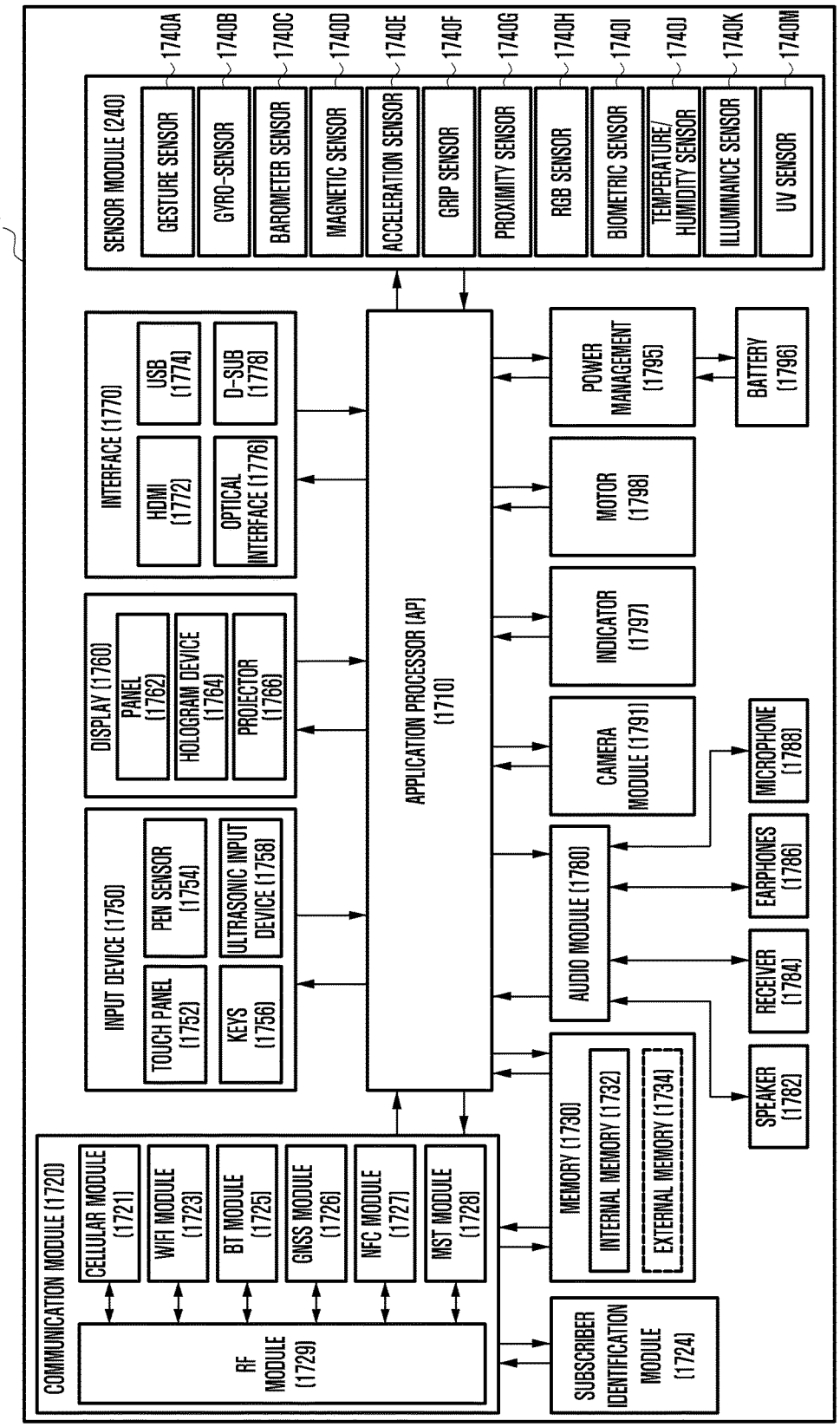
FIG. 17 is a block diagram illustrating an example configuration of an electronic device according to various example embodiments.

FIG. 17 is a block diagram illustrating a configuration of an example electronic device 1701 according to embodiments of the present disclosure.

The electronic device 1701 may include one or more processors (e.g., including processing circuitry) 1710, such as application processors (APs), a communication module (e.g., including communication circuitry) 1720, a subscriber identification module (SIM) card 1724, a memory 1730, a sensor module 1740, an input device 1750, a display 1760, an interface (e.g., including interface circuitry) 1770, an audio module 1780, a camera module 1791, a power management module 1795, a battery 1796, an indicator 1797, and a motor 1798.

The processor 1710 may include various processing circuitry that is capable of driving an OS or an application program to control a plurality of hardware or software components connected to the processor 1710, processing various data, and performing operations. The processor 1710 may be implemented as a system on chip (SoC), may further include a graphic processing unit (GPU) and/or an image signal processor, and may also include at least a portion of the components shown in FIG. 17. The processor 1710 is capable of loading commands or data received from at least one of other components, such as a non-volatile memory, on a volatile memory, processing the loaded commands or data, and of storing various data in a non-volatile memory.

The communication module 1720 may include various communication circuitry, such as, for example, and without limitation, a cellular module 1721, WiFi module 1723, Bluetooth® (BT) module 1725, GNSS module 1726, NFC module 1727, MST module 1728, and radio frequency (RF) module 1729.

The cellular module 1721 is capable of providing a voice call, a video call, a short message service (SMS), or an Internet service, through a communication network, for example, and is capable of identifying and authenticating an electronic device 1701 in a communication network by using a subscriber identification module (SIM) card 1724, performing at least a portion of the functions provided by the processor 1710, and including a communication processor (CP).

Each of the WiFi module 1723, the BT module 1725, the GNSS module 1726, and the NFC module 1727 is capable of including a processor for processing data transmitted or received through the corresponding module. The MST module 1728 is capable of including a processor for processing data transmitted or received through the corresponding module. According to embodiments, at least two of the modules may be included in one integrated chip (IC) or one IC package.

The RF module 1729 is capable of transmission/reception of communication signals, e.g., RF signals, and including a transceiver, a power amp module (PAM), a frequency filter, a low noise amplifier (LNA), and an antenna. According to another embodiment, at least one of the cellular module 1721, WiFi module 1723, BT module 1725, GNSS module 1726, NFC module 1727, and MST module 1728 is capable of transmission/reception of RF signals through a separate RF module.

The SIM card 1724 is capable of including a card including a subscriber identification module (SIM) and/or an embedded SIM, and containing unique identification information, such as an integrated circuit card identifier (ICCID), or subscriber information, such as an international mobile subscriber identity (IMSI).

The memory 1730 is capable of including a built-in memory 1732 and/or an external memory 1734. The built-in memory 1732 is capable of including at least one of a volatile memory, such as a dynamic RAM (DRAM), a static RAM (SRAM), a synchronous dynamic RAM (SDRAM), and a non-volatile memory, such as a one-time programmable ROM (OTPROM), a programmable ROM (PROM), an erasable and programmable ROM (EPROM), an electrically erasable and programmable ROM (EEPROM), a mask ROM, a flash ROM, a flash memory, such as a NAND flash memory or an NOR flash memory, a hard drive, and a solid state drive (SSD).

The external memory 1734 is also capable of including a flash drive, such as a compact flash (CF), a secure digital (SD), a micro secure digital (Micro-SD), a mini secure digital (Mini-SD), an extreme digital (xD), a multi-media card (MMC), or a memory stick. The external memory 1734 is capable of being connected to the electronic device 1701, functionally and/or physically, through various interfaces.

The memory 1730 is capable of storing payment information and a payment application serving as one of the applications 14D. The payment information may refer to credit card numbers and PINs, corresponding to a credit card, and may also include user authentication information, such as fingerprints, facial features, and voice information.

When the payment application is executed by the processor 1710, the processor 1710 may be enabled to perform an interaction with the user to make payment, such as displaying a screen to select a card and obtaining information corresponding to the selected card from payment information, and an operation to control magnetic field communication, such as transmitting the card information to a card reading apparatus, through the NFC module 1727 or MST module 1728.

The sensor module 1740 is capable of measuring/detecting a physical quantity or an operation state of the electronic device 1701, and converting the measured or detected information into an electronic signal. The sensor module 1740 is capable of including at least one of a gesture sensor 1740A, a gyro sensor 1740B, an atmospheric pressure sensor (e.g., barometer) 1740C, a magnetic sensor 1740D, an acceleration sensor 1740E, a grip sensor 1740F, a proximity sensor 1740G, a color sensor 1740H, such as a red, green and blue (RGB) sensor, a biometric sensor 1740I, a temperature/humidity sensor 1740J, an illuminance sensor 1740K, and a ultraviolet (UV) sensor 1740M. The sensor module 1740 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor, and a control circuit for controlling one or more sensors included therein.

In embodiments, the electronic device 1701 is capable of including a processor, configured as a portion of the processor 1710 or a separate component, for controlling the sensor module 1740. In this case, the processor is capable of controlling the sensor module 1740 while the processor 1710 is operating in sleep mode.

The input device 1750 may include various input circuitry, such as, for example, and without limitation, a touch panel 1752, a (digital) pen sensor 1754, a key 1756, and an ultrasonic input unit 1758. The touch panel 1752 may be implemented with at least one of a capacitive touch system, a resistive touch system, an infrared touch system, and an ultrasonic touch system. The touch panel 1752 may further include a control circuit, and a tactile layer to provide a tactile response to the user.

The (digital) pen sensor 1754 may be implemented with a portion of the touch panel or with a separate recognition sheet. The key 1756 may include a physical button, an optical key, or a keypad. The ultrasonic input unit 1758 is capable of detecting ultrasonic waves, created in an input tool, through a microphone 1788, and identifying data corresponding to the detected ultrasonic waves.

The display 1760 is capable of including a panel 1762, a hologram unit 1764, or a projector 1766. The panel 1762 may include the same or similar configurations as the display 16 shown in FIG. 1A, may be implemented to be flexible, transparent, or wearable, and may also be incorporated into one module together with the touch panel 1752. The hologram unit 1764 is capable of projecting a stereoscopic image in the air by using light interference. The projector 1766 is capable of displaying an image by projecting light onto a screen positioned inside or outside the electronic device 1701. According to an embodiment, the display 1760 may further include a control circuit for controlling the panel 1762, the hologram unit 1764, or the projector 1766.

The interface 1770 may include various interface circuitry, such as, for example, and without limitation, a high-definition multimedia interface (HDMI) 1772, a universal serial bus (USB) 1774, an optical interface 1776, and a D-subminiature (D-sub) 1778, may be included in the communication interface 17 shown in FIG. 1A, and is capable of including a mobile high-definition link (MHL) interface, a secure digital (SD) card/multimedia card (MMC) interface, or an infrared data association (IrDA) standard interface.

The audio module 1780 is capable of providing bidirectional conversion between a sound and an electronic signal. At least a portion of the components in the audio module 1780 may be included in the input/output interface 15 shown in FIG. 1A. The audio module 1780 is capable of processing sound information input or output through a speaker 1782, a receiver 1784, earphones 1786, and microphone 1788.

The camera module 1791 is capable of taking both still and moving images and including one or more image sensors, such as a front image sensor or a rear image sensor, a lens, an image signal processor (ISP), and a flash, such as a light-emitting diode (LED) or xenon lamp.

The power management module 1795 is capable of managing power of the electronic device 1701 and including a power management integrated circuit (PMIC), a charger IC, and a battery gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, or a rectifier. The battery gauge is capable of measuring the residual capacity, charge in voltage, current, or temperature of the battery 1796, which is either a rechargeable battery or a solar battery.

The indicator 1797 is capable of displaying a specific status of the electronic device 1701 or a portion thereof, such as a boot-up, message, or charging status. The motor 1798 is capable of converting an electrical signal into mechanical vibrations, such as, a vibration or haptic effect. The electronic device 1701 is capable of further including a GPU for supporting a mobile TV. The processing unit for supporting a mobile TV is capable of processing media data pursuant to standards, such as digital multimedia broadcasting (DMB), digital video broadcasting (DVB), or mediaFlo™.

Each of the elements described in the present disclosure may be formed of one or more components, and the names of the corresponding elements may vary according to the type of the electronic device. In embodiments, the electronic device may include at least one of the above described elements described in the present disclosure, and may exclude some of the elements or further include other additional elements. Some of the elements of the electronic device according to embodiments may be coupled to form a single entity while performing the same functions as those of the corresponding elements before the coupling.

Figure 18:
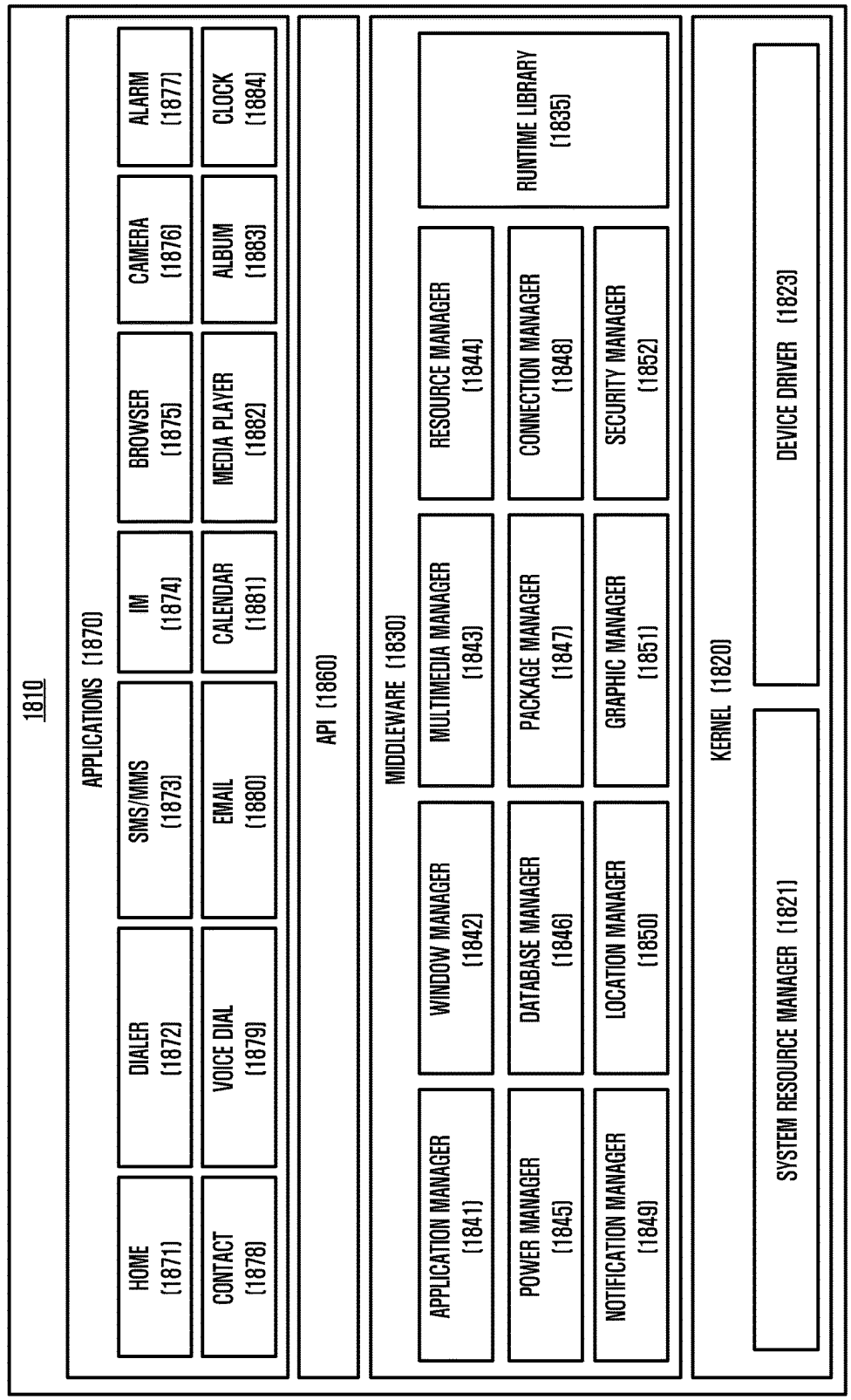
FIG. 18 is a block diagram illustrating an example configuration of a program module according to various example embodiments.

FIG. 18 is a block diagram illustrating an example programming module according to example embodiments of the present disclosure. The program module 1810 is capable of including an OS for controlling resources related to the electronic device and/or various applications running on the OS, which may be Android, iOS, Windows, Symbian, Tizen, or Bada, for example.

The program module 1810 is capable of including a kernel 1820, middleware 1830, application programming interface (API) 1860 and/or applications 1870. At least a portion of the program module 1810 may be preloaded on the electronic device or downloaded from a server.

The kernel 1820 may include a system resource manager 1821 and/or a device driver 1823. The system resource manager 1821 may include, for example, a process manager, a memory manager, and a file system manager, and may perform a system resource control, allocation, and recall. The device driver 1823 may include, for example, a display driver, a camera driver, a Bluetooth driver, a shared memory driver, a USB driver, a keypad driver, a WiFi driver, n audio driver, and an inter-process communication (IPC) driver.

The middleware 1830 may provide a function required in common by the applications 1870 through the API 1860, to enable the applications 1870 to efficiently use limited system resources within the electronic device, and may include at least one of a runtime library 1835, an application manager 1841, a window manager 1842, a multimedia manager 1843, a resource manager 1844, a power manager 1845, a database manager 1846, a package manager 1847, a connection manager 1848, a notification manager 1849, a location manager 1850, a graphic manager 1851, and a security manager 1852.

The runtime library 1835 may include a library module used by a complier to add a new function through a programming language while the applications 1870 are executed. For example, the runtime library 1835 executes input and output, management of a memory, and a function associated with an arithmetic function.

The application manager 1841 may manage a life cycle of at least one of the applications 1870. The window manager 1842 may manage GUI resources used on the screen. The multimedia manager 1843 may detect a format required for reproducing various media files and perform an encoding or a decoding of a media file by using a codec suitable for the corresponding format. The resource manager 1844 manages resources such as a source code, a memory, and a storage space of at least one of the applications 1870.

The power manager 1845 may operate together with a basic input/output system (BIOS) to manage a battery or power and provides power information required for the operation. The database manager 1846 may manage generation, search, and change of a database to be used by at least one of the applications 1870. The package manager 1847 may manage an installation or an update of an application distributed in a form of a package file.

The connection manager 1848 may manage a wireless connection such as WiFi or Bluetooth®. The notification manager 1849 may display or notify a user of an event such as an arrival message, an appointment, or a proximity alarm, in a manner that does not disturb the user. The location manager 1850 may manage location information of the electronic device. The graphic manager 1851 may manage a graphic effect provided to the user or a user interface related to the graphic effect. The security manager 1852 provides a general security function required for a system security or a user authentication. According to an embodiment, when the electronic device has a call function, the middleware 1830 may further include a telephony manager for managing a voice of the electronic device or a video call function.

The middleware 1830 is capable of including modules configuring various combinations of functions of the above described components, providing modules specialized according to types of operation systems to provide distinct functions, and being adaptively configured in such a manner as to remove a portion of the existing components or to include new components.

The API 1860 may be a set of API programming functions, and may be provided with a different configuration according to an operating system. For example, in Android or iOS, a single API set may be provided for each platform. In Tizen, two or more API sets may be provided.

The applications 1870 may include one or more applications for performing various functions, such as a home 1871, dialer 1872, SMS/multimedia messaging service (MMS) 1873, instant message (IM) 1874, browser 1875, camera 1876, alarm 1877, contact 1878, voice dial 1879, email 1880, calendar 1881, media player 1882, album 1883, clock 1884. Additionally, or alternatively, though not shown, the applications 1870 may include applications relating to, for example, health care, such as an application for measuring amount of exercise or blood sugar level, and environment information, such as an application for providing atmospheric pressure, humidity, or temperature.

According to an embodiment, the applications 1870 are capable of including an information exchange application for supporting information exchange between an electronic device and an external device. The information exchange application is capable of including a notification relay application for relaying specific information to external devices or a device management application for managing external devices.

For example, the notification relay application is capable of including a function for relaying notification information, created in other applications of the electronic device, such as SMS/MMS, email, health care, and environment information applications, to external devices. In addition, the notification relay application is capable of receiving notification information from external devices to provide the received information to the user.

The device management application is capable of managing at least one function of an external device communicating with the electronic device. Examples of the function are a function of turning-on/off the external device or a portion of the external device, a function of controlling the brightness of the display, applications running on the external device, and services provided by the external device. Examples of the services are a call service and a messaging service.

According to embodiments, the applications 1870 are capable of including an application specified attributes of an external device, applications received from an external device, and a preloaded application or third party applications that can be downloaded from a server. It should be understood that the components of the program module 1810 may be referred to by different names according to types of operating systems.

At least a portion of the program module 1810 can be implemented with one or a combination of at least two of software, firmware, and hardware, can be executed by a processor, and may include modules, programs, routines, and sets of instructions or processes in order to perform one or more functions.

The term "module" as used in embodiments of the present disclosure may indicate a unit including one or at least two of hardware, software, and firmware. The term "module" may be interchangeable with the term "unit", "logic", "logical block", "component", or "circuit". The 'module' may be the smallest unit of an integrated component or a portion thereof, may be the smallest unit that performs one or more functions or a portion thereof, and may be mechanically or electronically implemented. For example, and without limitation, the "module" according to embodiments of the present disclosure may include at least one of a dedicated processor, a CPU, application-specific integrated circuit (ASIC) chips, field-programmable gate arrays (FPGAs), and programmable-logic devices for performing certain operations, which are now known or will be developed in the future.

At least a portion of the method or system according to embodiments of the present disclosure can be implemented with instructions as program modules that are stored in computer-readable storage media. One or more processors can execute instructions, thereby performing the functions. An example of the computer-readable storage media may be the memory 13. At least a portion of the program modules can be executed by a processor and may include modules, programs, routines, sets of instructions or processes, etc., in order to perform one or more functions.

Examples of the computer-readable storage media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as read-only memory (ROM), random access memory (RAM), and flash memory. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa, namely, one or more software modules may be configured to act as the described hardware devices in order to perform the operations and methods described above.

Modules or program modules according to embodiments of the present disclosure may include one or more components, remove a portion of the one or more components described above, or include new components. The operations performed by modules, program modules, or the other components may be executed in a serial, parallel, repetitive, or heuristic fashion. Portion of the operations can be executed in any other order, skipped, or executed with additional operations.

The example embodiments of the present disclosure described in the description and drawings along with particular terms are merely provided to aid in a comprehensive understanding of the present disclosure and are not suggestive of limitation.

While the present disclosure has been illustrated and described with reference to various example embodiments thereof, it will be apparent to those of ordinary skill in the art that various changes in form and detail may be made thereto without departing from the spirit and scope of the present disclosure as defined by the appended claims and their equivalents.

According to various example embodiments of the present disclosure, an electronic device that can secure an emission performance can be provided. Various kinds of antennas may be received within a limited space of the electronic device. Even if a portion of a housing of the electronic device is made of a metal, a magnetic flux generated within the housing can be emitted to the outside.

What is claimed is:

1. An electronic device, comprising:
    a housing comprising a first surface facing in a first direction, a second surface facing in a second direction opposite the first direction, and a side member enclosing at least a portion of a space between the first surface and the second surface;
    a first metal plate positioned between the first surface and the second surface;
    a conductive coil positioned within the housing, having a shaft substantially perpendicular to the first direction or the second direction, and that winds around the first metal plate;
    a first communication circuit positioned within the housing and electrically connected to the conductive coil;
    a second communication circuit positioned within the housing and electrically connected to the first metal plate;
    a display exposed through at least a portion of the first surface; and
    a processor positioned within the housing and electrically connected to the first communication circuit, the second communication circuit, and the display,
    wherein the second surface comprises a first portion comprising a conductive material and including a first opening and a second portion comprising a non-conductive material that fills the first opening,
    the conductive coil is positioned under the first portion when viewed from above the second surface,
    a portion of the first metal plate is wound with the conductive coil,
    another portion of the first metal plate is electrically connected to the second communication circuit,
    the another portion extends to the first opening when viewed from above the second surface,
    a first magnetic flux is generated in the conductive coil by the first communication circuit, and
    a second magnetic flux advancing in a direction perpendicular to an advancing direction of the first magnetic flux is generated by the second communication circuit in the another portion of the first metal plate.

2. The electronic device of claim 1, wherein, in the first metal plate, the another portion comprises an opening for induction of the second magnetic flux.

3. The electronic device of claim 2, wherein the opening for induction of the second magnetic flux is a spiral-shaped slit formed within the another portion in the first metal plate.

4. The electronic device of claim 1, wherein the first metal plate comprises a plane substantially parallel to the first surface or the second surface.

5. The electronic device of claim 1, wherein the first metal plate comprises a plate comprising a magnetic body.

6. The electronic device of claim 5, further comprising a battery,
    wherein at least a portion of the plate is disposed between the second surface and the battery.

7. The electronic device of claim 1, wherein, in the second surface, the first portion comprises a second opening separated from the first opening,
    the second surface comprises a third portion that fills the second opening, and
    in the first metal plate, another portion extends to the second opening.

8. The electronic device of claim 7, wherein the shaft substantially extends in a third direction advancing from the second portion to the third portion when viewed from above the second surface.

9. The electronic device of claim 7, wherein the second portion and the third portion are enclosed by the first portion when viewed from above the second surface.

10. The electronic device of claim 7, wherein the openings comprise slits formed at the second surface in a straight line form substantially perpendicular to the shaft.

11. The electronic device of claim 1, further comprising a battery,
    wherein the battery comprises a first battery portion and a second battery portion positioned lower than the first battery portion when viewed from above the second surface, and
    the portion of the first metal plate is bent downward to be positioned above the second battery portion when viewed from above the second surface.

12. The electronic device of claim 11, wherein the second battery portion comprises a protection circuit of the battery.

13. The electronic device of claim 1, further comprising a second metal plate,
    wherein in the second surface, the first portion comprises a second opening separated from the first opening,
    the second surface comprises a third portion that fills the second opening, and
    an end portion of the second metal plate contacts and/or is adjacent to an end portion of the first metal plate, and another end portion of the second metal plate extends to the second opening.

14. The electronic device of claim 13, wherein the second metal plate is made of a material different from that of the first metal plate.

15. The electronic device of claim 14, wherein the first metal plate comprises a magnetic body, and the second metal plate comprises ferrite.

16. The electronic device of claim 1, wherein the first metal plate is bonded to the second surface.

17. The electronic device of claim 1, further comprising a battery,
    wherein the battery comprises a first portion and a second portion positioned lower than the first portion when viewed from above the first surface, and
    the portion of the first metal plate is bent downward to be positioned above the second portion when viewed from above the first surface.

18. The electronic device of claim 1, further comprising a battery,
    wherein the battery comprises a first portion and a second portion positioned lower than the first portion when viewed from above the second surface,
    the portion of the first metal plate is bent downward to be positioned above the second portion when viewed from above the second surface, and
    the conductive coil is wound in one direction in the first portion and the portion of the first metal plate.

19. The electronic device of claim 1, further comprising a heat blocking member positioned in at least one of: a location under the first opening and a location at an outer edge of the metal plate.

20. An electronic device, comprising:
    a housing comprising a first surface facing in a first direction, a second surface facing in a second direction opposite the first direction, and a side member enclosing at least a portion of a space between the first surface and the second surface;
    an internal structure comprising a pattern and positioned between the first surface and the second surface;

a conductive coil positioned within the housing, having a shaft substantially perpendicular to the first direction or the second direction, and that encloses a portion of the internal structure;
a first communication circuit positioned within the housing and configured to enable the conductive coil to generate a magnetic flux;
a second communication circuit positioned within the housing and configured to enable a portion of the conductive coil to generate an electromagnetic signal;
a display exposed through at least a portion of the first surface; and
a processor positioned within the housing and electrically connected to the communication circuits and the display,
wherein the second surface comprises:
a first portion comprising a conductive material and comprising two separated openings;
a second portion comprising a non-conductive material and that fills one of the openings; and
a third portion comprising a non-conductive material and that fills another one of the openings,
wherein the conductive coil is positioned substantially under the first portion when viewed from above the second surface, and
the internal structure extends between one and another one of the openings such that the generated magnetic flux penetrates the openings.

* * * * *

UNITED STATES PATENT AND TRADEMARK OFFICE
CERTIFICATE OF CORRECTION

PATENT NO. : 10,468,746 B2
APPLICATION NO. : 15/718327
DATED : November 5, 2019
INVENTOR(S) : Lee et al.

Page 1 of 1

It is certified that error appears in the above-identified patent and that said Letters Patent is hereby corrected as shown below:

On the Title Page

[30]   Foreign Application Priority Data
Oct. 5, 2006   (KR) ……………10-2016-0128402
Delete the phrase "Oct. 5, 2006" and insert --Oct. 5, 2016--

Signed and Sealed this
Eighteenth Day of February, 2020

Andrei Iancu
*Director of the United States Patent and Trademark Office*